US012674032B2

(12) United States Patent
Mahadevan et al.

(10) Patent No.: US 12,674,032 B2
(45) **Date of Patent: *Jul. 7, 2026**

(54) POLYMERIZABLE FUSED TRICYCLIC COMPOUNDS AS ABSORBERS OF UV AND VISIBLE LIGHT

(71) Applicant: Johnson & Johnson Vision Care, Inc., Jacksonville, FL (US)

(72) Inventors: Shivkumar Mahadevan, Jacksonville, FL (US); Dawn D. Wright, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 349 days.

This patent is subject to a terminal disclaimer.

(21) Appl. No.: 18/065,237

(22) Filed: Dec. 13, 2022

(65) Prior Publication Data

US 2023/0117655 A1 Apr. 20, 2023

Related U.S. Application Data

(63) Continuation-in-part of application No. 16/883,199, filed on May 26, 2020.

(60) Provisional application No. 63/265,706, filed on Dec. 20, 2021, provisional application No. 62/867,963, filed on Jun. 28, 2019.

(51) Int. Cl.
*C08G 77/445* (2006.01)

(52) U.S. Cl.
CPC .................................. *C08G 77/445* (2013.01)

(58) Field of Classification Search
CPC .............................. C08G 77/445; G02B 1/043
See application file for complete search history.

(56) References Cited

U.S. PATENT DOCUMENTS 3,196,150 A 7/1965 Martin
3,376,303 A 4/1968 Otto et al.
3,408,429 A 10/1968 Otto
3,660,545 A 5/1972 Wichterle
3,769,294 A 10/1973 Catino et al.
3,808,178 A 4/1974 Gaylord
4,113,224 A 9/1978 Clark et al.
4,120,570 A 10/1978 Gaylord
4,136,250 A 1/1979 Mueller et al.
4,153,641 A 5/1979 Deichert et al.
4,197,266 A 4/1980 Clark et al.
4,436,887 A 3/1984 Chromecek et al.
4,495,313 A 1/1985 Larsen
4,659,763 A 4/1987 Gallucci et al.
4,659,782 A 4/1987 Spinelli
4,659,783 A 4/1987 Spinelli
4,716,234 A 12/1987 Dunks et al.
4,740,533 A 4/1988 Su et al.
4,889,664 A 12/1989 Kindt-Larsen et al.
4,910,277 A 3/1990 Bambury et al.
4,997,897 A 3/1991 Melpolder
5,006,622 A 4/1991 Kunzler et al.
5,034,461 A 7/1991 Lai et al.
5,039,459 A 8/1991 Kindt-larsen et al.
5,070,215 A 12/1991 Bambury et al.
5,236,969 A 8/1993 Kunzler et al.
5,244,981 A 9/1993 Seidner et al.
5,270,418 A 12/1993 Kunzler et al.
5,298,533 A 3/1994 Nandu et al.
5,314,960 A 5/1994 Spinelli et al.
5,331,067 A 7/1994 Seidner et al.
5,371,147 A 12/1994 Spinelli et al.
5,470,932 A 11/1995 Jinkerson
5,480,927 A 1/1996 Janssen et al.
5,729,322 A 3/1998 Collins et al.
5,760,100 A 6/1998 Nicolson et al.
5,776,999 A 7/1998 Nicolson et al.
5,789,461 A 8/1998 Nicolson et al.
5,824,719 A 10/1998 Kunzler et al.
5,849,811 A 12/1998 Nicolson et al.
5,872,118 A 2/1999 Kelley et al.
5,916,719 A 6/1999 Kim et al.
(Continued)

FOREIGN PATENT DOCUMENTS

CN 203965745 U 11/2014
CN 106349212 A 1/2017
(Continued)

OTHER PUBLICATIONS

PCT International Preliminary Report on Patentability, dated Jun. 13, 2023, for PCT Int'l Appln. No. PCT/IB2021/061175.
Belikov, V.G., "The Relationship Between Chemical Structure, Properties of Substances and Their Effect on the Organism", Pharmaceutical Chemistry, pp. 27-29, 2007.
Dyson et al., "Chemistry of Synthetic Drugs Substances", Moscow: Mir, 18 pages, 1964.
Fadli et al., "Permeation and Pervaporation of Water through Contact Lens Materials", Johnson & Johnson Vision Care, Inc. Jacksonville, FL, USA, 1 page, 2016.
(Continued)

*Primary Examiner* — Alicia L Otton
(74) *Attorney, Agent, or Firm* — Raef M. Shaltout

(57) ABSTRACT

Described are polymerizable fused tricyclic compounds of formula I:

formula I

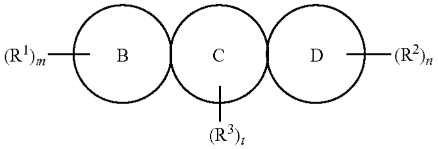

wherein $R^1$, $R^2$, $R^3$, m, n, t, and rings B, C, and D are as defined herein. The compounds absorb various wavelengths of ultraviolet and/or visible light (such as high energy visible light) and are suitable for incorporation in a variety of products, such as biomedical devices and ophthalmic devices.

15 Claims, 6 Drawing Sheets

(56) References Cited

U.S. PATENT DOCUMENTS 5,944,853 A 8/1999 Molock et al.
5,945,465 A 8/1999 Ozark et al.
5,962,548 A 10/1999 Vanderlaan et al.
5,965,631 A 10/1999 Nicolson et al.
5,977,219 A 11/1999 Ravichandran et al.
5,998,498 A 12/1999 Vanderlaan et al.
6,020,445 A 2/2000 Vanderlaan et al.
6,022,158 A 2/2000 Nakayama et al.
6,087,415 A 7/2000 Vanderlaan et al.
6,158,862 A 12/2000 Patel et al.
6,166,218 A 12/2000 Ravichandran et al.
6,207,244 B1 3/2001 Hesch
6,244,707 B1 6/2001 Faubl
6,367,929 B1 4/2002 Maiden et al.
6,373,615 B1 4/2002 Mann et al.
6,420,453 B1 7/2002 Bowers et al.
6,423,761 B1 7/2002 Bowers et al.
6,527,977 B2 3/2003 Helber et al.
6,767,979 B1 7/2004 Muir et al.
6,807,745 B2 10/2004 Orton
6,822,016 B2 11/2004 McCabe et al.
6,867,245 B2 3/2005 Iwata et al.
6,918,931 B2 7/2005 Lai et al.
6,943,203 B2 9/2005 Vanderlaan et al.
6,951,894 B1 10/2005 Nicolson et al.
7,033,391 B2 4/2006 Lai et al.
7,052,131 B2 5/2006 McCabe et al.
7,247,692 B2 7/2007 Laredo
7,249,848 B2 7/2007 Laredo et al.
7,276,544 B2 10/2007 Lai et al.
7,396,890 B2 7/2008 Zanini et al.
7,461,937 B2 12/2008 Steffen et al.
7,468,398 B2 12/2008 Nicolson et al.
7,538,146 B2 5/2009 Nicolson et al.
7,553,860 B2 6/2009 Old
7,553,880 B2 6/2009 Nicolson et al.
7,572,841 B2 8/2009 Chen et al.
7,666,921 B2 2/2010 McCabe et al.
7,691,916 B2 4/2010 McCabe et al.
7,691,918 B2 4/2010 Jinkerson et al.
7,728,051 B2 6/2010 Weinschenk, III et al.
7,781,571 B2 8/2010 Weinschenk, III et al.
7,786,185 B2 8/2010 Rathore et al.
7,803,359 B1 9/2010 Jinkerson et al.
7,825,170 B2 11/2010 Steffen et al.
7,915,323 B2 3/2011 Awasthi et al.
7,934,830 B2 5/2011 Blackwell et al.
7,956,131 B2 6/2011 Arnold et al.
7,994,356 B2 8/2011 Awasthi et al.
8,022,158 B2 9/2011 Rathore et al.
8,026,326 B2 9/2011 Benz et al.
8,043,607 B2 10/2011 Jinkerson
8,113,655 B1 2/2012 Tyrin et al.
8,138,290 B2 3/2012 Blackwell et al.
8,153,703 B2 4/2012 Laredo
8,163,206 B2 4/2012 Chang et al.
8,207,244 B2 6/2012 Laredo
8,236,053 B1 8/2012 Freeman
8,262,947 B2 9/2012 Laredo
8,262,948 B2 9/2012 Laredo et al.
8,273,802 B2 9/2012 Laredo et al.
8,323,631 B2 12/2012 Jinkerson
8,329,775 B2 12/2012 Laredo
8,360,574 B2 1/2013 Ishak et al.
8,389,597 B2 3/2013 Blackwell et al.
8,399,538 B2 3/2013 Steffen et al.
8,415,404 B2 4/2013 Nicolson et al.
8,420,711 B2 4/2013 Awasthi et al.
8,450,387 B2 5/2013 McCabe et al.
8,470,906 B2 6/2013 Rathore et al.
8,476,390 B2 7/2013 Benz et al.
8,487,058 B2 7/2013 Liu et al.
8,507,577 B2 8/2013 Zanini et al.
8,568,626 B2 10/2013 Nicolson et al.
8,585,938 B1 11/2013 Jinkerson et al.
8,618,323 B2 12/2013 Benz et al.
8,637,621 B2 1/2014 Iwata et al.
8,697,770 B2 4/2014 Duis et al.
8,703,891 B2 4/2014 Broad
8,784,867 B2 7/2014 Samuel et al.
8,807,745 B2 8/2014 Nunez et al.
8,940,812 B2 1/2015 Reboul et al.
8,980,972 B2 3/2015 Driver
9,005,700 B2 4/2015 Bothe et al.
9,056,878 B2 6/2015 Fujisawa et al.
9,057,821 B2 6/2015 Broad et al.
9,125,829 B2 9/2015 Bonda et al.
9,145,383 B2 9/2015 Bonda et al.
9,170,349 B2 10/2015 Mahadevan et al.
9,217,813 B2 12/2015 Liu et al.
9,244,196 B2 1/2016 Scales et al.
9,249,249 B2 2/2016 Awasthi et al.
9,260,544 B2 2/2016 Rathore et al.
9,278,949 B2 3/2016 Loccufier
9,297,928 B2 3/2016 Molock et al.
9,297,929 B2 3/2016 Scales et al.
9,315,669 B2 4/2016 Holland et al.
9,611,246 B2 4/2017 Bonda et al.
9,637,444 B2 5/2017 Qian
9,667,800 B2 5/2017 Rodriguez et al.
9,733,493 B2 8/2017 Wooley
9,765,051 B2 9/2017 Bonda et al.
9,867,800 B2 1/2018 Bonda et al.
9,926,289 B2 3/2018 Bonda et al.
9,927,635 B2 3/2018 Ishak et al.
9,957,258 B2 5/2018 Kunimoto et al.
10,113,075 B2 10/2018 Nesvadba et al.
10,268,053 B2 4/2019 Holland et al.
10,338,408 B2 7/2019 Bothe et al.
10,597,515 B2 3/2020 Nesvadba et al.
11,401,400 B2 8/2022 Shishino et al.
11,543,683 B2 1/2023 Mahadevan et al.
11,820,899 B2 11/2023 Mahadevan et al.
11,993,037 B1 5/2024 Mahadevan et al.
2002/0042653 A1 4/2002 Copeland et al.
2004/0070726 A1 4/2004 Ishak
2005/0018131 A1 1/2005 Ishak
2005/0055090 A1 3/2005 Lai et al.
2005/0055091 A1 3/2005 Lai et al.
2005/0243272 A1 11/2005 Mainster et al.
2005/0254003 A1 11/2005 Jani et al.
2006/0092374 A1 5/2006 Ishak
2006/0252850 A1 11/2006 Jani et al.
2007/0092830 A1 4/2007 Lai et al.
2007/0092831 A1 4/2007 Lai et al.
2007/0100018 A1 5/2007 Hagting et al.
2007/0216861 A1 9/2007 Ishak et al.
2008/0002147 A1 1/2008 Haywood et al.
2008/0221674 A1 9/2008 Blum et al.
2010/0048847 A1 2/2010 Broad
2010/0113641 A1 5/2010 Laredo
2010/0168359 A1 7/2010 Domschke et al.
2010/0321632 A1 12/2010 Sanger
2011/0245818 A1 10/2011 Weinschenk, III et al.
2011/0249234 A1 10/2011 Duis et al.
2012/0010703 A1 1/2012 Paul et al.
2012/0053313 A1 3/2012 Higgs et al.
2012/0196951 A1 8/2012 Mentak
2012/0262792 A1 10/2012 Goldberg et al.
2013/0009059 A1 1/2013 Caruso
2013/0057824 A1 3/2013 Harding et al.
2013/0095235 A1 4/2013 Bothe et al.
2013/0158150 A1 6/2013 Zhang et al.
2013/0168617 A1 7/2013 Alli et al.
2013/0172440 A1 7/2013 Alli et al.
2013/0217620 A1 8/2013 Alli et al.
2014/0024791 A1 1/2014 Alli et al.
2014/0031447 A1 1/2014 Alli et al.
2014/0044654 A1 2/2014 Bonda et al.
2014/0050681 A1 2/2014 Bonda et al.
2014/0093661 A1 4/2014 Trajkovska et al.
2014/0178595 A1 6/2014 Bothe et al.
2014/0300857 A1 10/2014 Cohen-Tannoudji et al.
2015/0092155 A1 4/2015 Chang et al.

(56) References Cited

U.S. PATENT DOCUMENTS

2015/0094395 A1 4/2015 Alli et al.
2015/0164852 A1 6/2015 Bonda et al.
2015/0175732 A1 6/2015 Awasthi et al.
2015/0316688 A1 11/2015 Cefalo et al.
2016/0002200 A1 1/2016 Bonda et al.
2016/0022555 A1 1/2016 Bonda et al.
2016/0170093 A1 6/2016 Laredo et al.
2017/0038605 A1 2/2017 Legerton
2017/0075137 A1 3/2017 Lin et al.
2017/0131574 A1 5/2017 Lee
2017/0184878 A1 6/2017 Duis et al.
2017/0227790 A1 8/2017 Lin et al.
2017/0261768 A1 9/2017 Ambler et al.
2018/0037690 A1 2/2018 Aitken et al.
2018/0164608 A1 6/2018 Schmeder et al.
2018/0208583 A1 7/2018 Kunimoto et al.
2018/0263951 A1 9/2018 Bonda et al.
2018/0371139 A1 12/2018 Mahadevan et al.
2019/0002415 A1 1/2019 Mahadevan et al.
2019/0002459 A1 1/2019 Mahadevan et al.
2019/0121162 A1 4/2019 Alli et al.
2019/0169438 A1 6/2019 Fromentin et al.
2019/0179170 A1 6/2019 Chang et al.
2019/0271798 A1 9/2019 Mahadevan et al.
2019/0271861 A1 9/2019 Hose
2020/0347166 A1 11/2020 Alli et al.
2020/0347167 A1 11/2020 Alli et al.
2020/0399429 A1 12/2020 Alli et al.
2020/0407324 A1 12/2020 Mahadevan et al.
2020/0407337 A1 12/2020 Mahadevan
2021/0061934 A1 3/2021 Martin et al.
2022/0194944 A1 6/2022 Mahadevan
2022/0340759 A1 10/2022 Riederer et al.
2022/0340760 A1 10/2022 Nankivil et al.
2023/0066936 A1 3/2023 Buch et al.
2023/0085695 A1 3/2023 Buch et al.
2023/0288728 A1 9/2023 Mahadevan et al.
2023/0296807 A1 9/2023 Aitken et al.
2024/0067825 A1 2/2024 Mahadevan et al.
2026/0003209 A1 1/2026 Martin et al.

FOREIGN PATENT DOCUMENTS

CN 106366241 A 2/2017
CN 108586289 A 9/2018
EP 0080539 B1 5/1986
EP 0131468 B1 1/1990
EP 0924203 A1 6/1999
EP 1870735 A1 12/2007
EP 2123638 A1 11/2009
EP 3419961 A1 1/2019
EP 3052534 B1 5/2019
EP 3419961 B1 9/2020
GB 217810 A 6/1924
GB 2319035 A 5/1998
JP H0743918 A 2/1995
JP 2004243596 A 9/2004
JP 2004277581 A 10/2004
JP 2008050463 A 3/2008
JP 4627009 B2 11/2010
JP 2011219512 A 11/2011
JP 5544017 B2 5/2014
JP 2016133593 A 7/2016
RU 2175321 C2 10/2001
RU 2196557 C2 1/2003
RU 2197907 C2 2/2003
RU 2294132 C2 2/2007
RU 2466173 C1 11/2012
RU 2481606 C1 5/2013
RU 2540655 C2 2/2015
RU 2557993 C1 7/2015
RU 2628462 C2 8/2017
WO 9963366 A1 12/1999
WO 2020177534 A1 3/2000
WO 0130866 A1 5/2001
WO 0212205 A1 2/2002
WO 0242281 A1 5/2002
WO 2003022321 A2 3/2003
WO 03089519 A1 10/2003
WO 2007050395 A2 5/2007
WO 2008061992 A2 5/2008
WO 2011130139 A1 10/2011
WO 2013055746 A1 4/2013
WO 2013188825 A1 12/2013
WO 2014018208 A1 1/2014
WO 2014025370 A1 2/2014
WO 2014026151 A1 2/2014
WO 2015048035 A1 4/2015
WO 2016100457 A1 6/2016
WO 2016175619 A1 11/2016
WO 2017073467 A1 5/2017
WO 2017106322 A1 6/2017
WO 2019166971 A1 9/2019
WO 2020261091 A1 12/2020

OTHER PUBLICATIONS

International Search Report and Written Opinion, received for PCT Application No. PCT/IB2018/053669, mailed on Jul. 17, 2018, 14 pages.
International Search Report and Written Opinion, received for PCT Application No. PCT/IB2018/054585, mailed on Nov. 9, 2018, 12 pages.
International Search Report and Written Opinion, received for PCT Application No. PCT/IB2018/054588, mailed on Oct. 4, 2018, 17 pages.
International Search Report and Written Opinion, received for PCT Application No. PCT/IB2023/055938, mailed on Oct. 18, 2023, 12 pages.
ISO 18369-3, "Ophthalmic Optics-Contact lenses", Measurement methods, Part 3, 44 pages, Aug. 15, 2006.
ISO 18369-4, "Ophthalmic Optics-Contact Lenses-Part 4: Physicochemical Properties of Contact Lens Materials", International Organization for Standardization, Aug. 15, 2006, 38 pages.
ISO 9913-1, "Optics and Optical Instruments—Contact Lenses—Part 1: Determination of Oxygen Permeability and Transmissibility by the FATT Method", International Organization for Standardization, Nov. 1, 1996, 16 pages.
"Compendium of Polymer Terminology and Nomenclature: IUPAC Recommendations", edited by: Richard G. Jones, Jaroslav Kahovec, Robert Stepto, Edward S. Walks, Michael Hess, Tatsuki Kitayama, and W. Val Metanomski., 2008.
"International Preliminary Report on Patentability Received for PCT Appin. No PCT/IB2020/055485", Mailed Date: Dec. 28, 2021, 8 Pages.
"International Preliminary Report on Patentability Received for PCT Appin. No. PCT/IB2020/057732", Mailed Date: Mar. 1, 2022, 8 Pages.
"International Preliminary Report on Patentability Received for PCT Appin. No. PCT/IB2020/057733", Mailed Date: Mar. 1, 2022, 9 Pages.
"International Search Report Received for PCT Appin. No. PCT/IB2019/051582", Mailed date May 24, 2019, 18 pages.
"International Search Report Received for PCT Appin. No. PCT/IB2020/057733", Mailed date Oct. 9, 2020, 16 Pages.
"International Search Report Received for PCT Appin. No. PCT/IB2021/061175", Mailed date Mar. 1, 2022, 15 Pages.
"Statement on Ocular Ultraviolet Radiation Hazards in Sunlight", American Optometric Association, Nov. 10, 1993.
Beatty et al., "Macular pigment and age related macular degeneration", Br. J. Ophthalmol. 1999, vol. 83, pp. 867-877.
Belusa, J. et al., "2-(2-Hydroxyphenyl)benzotriazoles. I. Synthesis and Their Ultraviolet and Infrared Spectra", In Chem.Zvesti, vol. 28, No. 5, pp. 673-679, 1974.
Bernstein et al., "Lutein, zeaxanthin, and meso-zeaxanthin: The basic and clinical science underlying carotenoid-based nutritional interventions against ocular disease", Progress in Retinal and Eye Research, vol. 50, pp. 34-66, (2016).

(56) References Cited

OTHER PUBLICATIONS

Berthon, et al., "Synthesis, Electrochemical and Spectroscopic Properties of Pendant Hydroquinone-and Quinone-Substitued Polypyridyl Ruthenium(II) Complexes", In Inorganica Himica Acta, vol. 204, pp. 3-7 , 1993.
Bondyreva E. Y., "Polimerization", Methodological Guidelines for Independent Work, Nizhnekamsk Chemical and Technological Institute of the Federal State Budget Educational Institution of Higher Professional Education, Kazan National Research Technological University, Nizhnekamsk, 2014, pp. 4-13.
Boon et al., "Factors Influencing the Chemical Stability of Carotenoids in Foods", Critical Reviews in Food Science and Nutrition, vol. 50, pp. 515-532 (2010).
Burton et al., "B-Carotene autoxidation: oxygen copolymerization, non-vitamin A products, and immunological activity", Can. J. Chem., vol. 92, pp. 305-316 (2014).
Chakrabarti et al., "Statistics of Real-World Hyperspectral Images", CVPR 2011, pp. 193-200, Jun. 20-25, 2011.
Chen et al., "Dicyanomethylenated Acridone Based Crystals: Torsional Vibration Confinement Induced Emission with Supramolecular Structure Dependent and Stimuli Responsive Characteristics", The Journal of Physical Chemistry, 2016, 587-597, 120.
Crivello, et al., "Photoinitiators for Free Radical Cationic and Anionic Photopolymerisation", In 2nd Edition John Wiley and Sons, New York, vol. III, pp. 275-298, 1998.
Das, et al., "In vitro and schematic model eye assessment of glare or positive dysphotopsia-type photic phenomena: comparison of a new material IOL to other monofocal IOLs", Journal of Cataract and Refractive Surgery, vol. 45, Issue 2, pp. 219-227, Feb. 2019.
Doutch, et al, "Ultraviolet Light Transmission through the Human Corneal Stroma is Reduced in the Periphery", In Journal of Biophysical, vol. 102, pp. 1258-1264, Mar. 2012.
Elsherif et al., "Contact Lenses for Color Vision Deficiency", Advanced Materials Technologies, vol. 6, Issue 1, pp. 1-9, Jan. 2021.
Foster et al., "Frequency of Metamerism in Natural Scenes", Journal of the Optical Society of America A, vol. 23, No. 10, pp. 2359-2372, Oct. 2006.
Hafez, et al, "Carbonyl and Thiocarbonyl Compounds. V. Synthesis of Newer Unsaturated Nitriles, Carboxylic Acids, and Esters Derived from Xanthene and Thiaxanthene", In Journal of Organic Chemistry, vol. 26, pp. 3988-3991, Oct. 1961.
Ham, et al., "Retinal Sensitivity to Damage from Short Wavelength Light", In Nature, vol. 260, pp. 153-155, 1976.
Hammond et al., "Contralateral comparison of blue-filtering and non-blue-filtering intraocular lenses: glare disability, heterochromatic contrast, and photostress recovery", Clinical Ophthalmology, 2010, pp. 1465-1473, vol. 4, Dovepress, US.
Harris et al., "Effect of Tinted Contact Lenses on Color Vision", Am J Optom Physiol Opt., vol. 53, No. 3, pp. 145-148, Mar. 1976.
International Conference on Harmonisation (ICH) of Technical Requirements for Registration of Pharmaceuticals for Human Use guideline, Q1B Photostability Testing of New Drug Substances and Products, published on Nov. 1996.
International Preliminary Report on Patentability Received for PCT Appin. No PCT/IB2020/055868, Mailed Date: Dec. 28, 2021, 9 Pages.
International Search Report Received for PCT Appin. No. PCT/IB2020/055485, Mailed date Jul. 23, 2020, 16 Pages.
International Search Report Received for PCT Appin. No. PCT/IB2020/057732, Mailed date Oct. 9, 2020, 15 Pages.
Jockusch, et al., "Photostabilization of Endogenous Porphyrins: Excited State Quenching by Fused Ring Cyanoacrylates", In Photchemical and Photobiological Sciences, vol. 13, No. 8, pp. 1180-1184, 2014.
Johnston et al., "Biologically Active Polymers from Spontaneous Carotenoid Oxidation: a New Frontier in Carotenoid Activity", Plos One, vol. 9, Issue 10, pp. 1-10 (Oct. 2014).
Kolpashchikova, et al., "Organic Chemistry" Part II. Arenes. Halogened Hydrocarbons, Ministry of Education of The Russian Federation, Yaroslavl State Technical University, 3 Pages, 1999.
Larn, et al., "Synthesis of Dinucleating Phenanthroline -Based Ligands", Tetrahedron, vol. 55 Issue 28, pp. 8377-8384, Jul. 9, 1999.
Latif, et al. "Cleavage of Xanthene Ethers a New Route to 9-Substituted Xanthenes", In Canadian Journal of Chemistry, vol. 42, pp. 1736-1740, 1964.
Laxer, "Soft Tinted Contact Lenses and Color Discrimination", International Contact Lens Clinic, vol. 17, pp. 88-91, Mar.-Apr. 1990.
Luning, et al., "Bimacrocylic 1,10-Phenanthroline Cyclophanes", In Chemischi Beri, vol. 123, Issue 3, pp. 643-645, 1990.
Macleod et al., "Chromaticity Diagram Showing Cone Excitation by Stimuli of Equal Luminance", Journal of the Optical Society of America, vol. 69, Issue 8, pp. 1183-1186, Aug. 1979.
Mencucci et al., "Visual Outcome, Optical Quality and Patients' Satisfaction with a New Monofocal Intraocular Lens, Enhanced for Intermediate Vision: Preliminary Results", Journal of Cataract and Refractive Surgery, vol. 46, Issue 3, pp. 378-387, Mar. 2020.
Miao et al., "Objective Optical Quality and Intraocular Scattering in Myopic Adults", Investigative Ophthalmology and Visual Science, vol. 55, No. 9, pp. 5582-5587, Sep. 2014.
Mostafa et al., "The Effect of Age and Gender on Tear Film Breakup Time", In Egyptian Journal of Medical Research, vol. 2, Issue 2, 11 pages, 2021.
Nascimento et al., "Statistics of Spatial Cone-excitation Ratios in Natural Scenes", Journal of the Optical Society of America A, vol. 19, Issue 8, pp. 1484-1490, Aug. 2002.
Nishino, et al ., "Manganese (III)-Mediated Carbon-Carbon Bond Formation in the Reaction of Xanthenes with Active Methylene Compounds", The journal of Organic Chemistry, Jan. 1, 1992, pp. 3551-3557, vol. 57, Issue 13.
Parraga et al., "Color and Luminance Information in Natural Scenes", Journal of the Optical Society of America A, vol. 15, No. 3, pp. 563-569, Mar. 1998.
Patel, et al., "Effect of Visual Display Unit Use on Blink Rate and Tear Stability", In Optom Visual Sci, vol. 68, Issue 11, pp. 888-892, 1991.
PCT International Preliminary Report on Patentability, dated Sep. 8, 2020, for PCT Int'l Appln. No. PCT/IB2019/051582.
PCT International Search Report, dated Sep. 23, 2020, for PCT Int'l Appln. No. PCT/IB2020/055868.
Pokorny et al., "Aging of the Human Lens", Applied Optics, vol. 26, No. 8, pp. 1437-1440, Apr. 1987.
Reck, et al., "Enantiopure Chiral Chiral Concave 1,10-Phenanthrolines", In European Journal of Organic Chemistry, vol. 2016 Issue 6 , pp. 1119-1131, 2016.
Ribeiro et al., "Antioxidant and pro-oxidant activities of carotenoids and their oxidation products", Food and Chemical Toxicology, vol. 120, pp. 681-699 (2018).
Sato, et al., "Synthesis and Characterization of Electron Transporting Polymers Having Thioxanthene Derivatives", In Synthetic Metals, vol. 105, pp. 55-60, ,Jan. 1, 1999.
Selvam, et al.,"Tunable anchoring groups@acridone-linked triphenylamine based pendant chromophores and their effects on the photovoltaic performance as sensitizers for dye-sensitized solar cells", RSC Advances, vol. 6 Issue 110, pp. 109054-109060, 2016.
Stockman et al., "The Spectral Sensitivities of the Middle- and Long-wavelength-sensitive Cones Derived from Measurements in Observers of Known Genotype", Vision Research, vol. 40, pp. 1711-1737, 2000.
Stringham et al., "Macular Pigment and Visual Performance in Glare: Benefits for Photostress Recovery, Disability Glare, and Visual Discomfort," IOVS, Sep. 2011, vol. 52, No. 10, pp. 7406-7415.
Sutyagin et al., "Chemistry and Physics of Polymers", In Training Manual, TPU Publishing House, Tomsk, Chapter 1, 40 pages, Chapter 2, pp. 19-56, 2003.

(56) References Cited

OTHER PUBLICATIONS

Takeda et al., "Anisotropic Dissociation of IT-TT Stacking and Flipping-Motion-Induced Crystal Jumping in Alkylacridones and Their Dicyanomethylene Derivatives", Chem. Eur. J., 2016, vol. 22, 7763-7770.
Tan, et al., "Dynamic Change of Optical Quality in Patients with Dry Eye Disease", In Invest Ophthalmol Vis Sci. vol. 56, Issue 5, pp. 2848-2854, May 2015.
Tester, et al., "Dysphotopsia in phakic and pseudophakic patients: incidence and relation to intraocular lens type", In Journal of Cataract, Refractive Surgery Voume 26, Issue 6 ,pp. 810-816, Jun. 2000.
Tsubota, et al., "Dry Eyes and Video Display Terminals", In New England Journal of Medicine, vol. 328, Issue 8, p. 584, Feb. 25, 1993.
Ty et al., "Oxidation and Thermal Degradation of Carotenoids", Journal of Oil Palm Research, vol. II, No. 1, pp. 62-78 (Jun. 1999).
Van den Berg, T. J. T. P, "Importance of Pathological Intraocular Light Scatter for Visual Disability", In Documenta Ophthalmologica, vol. 61, pp. 327-333, 1986.
Xi et al., "Assessment of Tear Film Optical Quality in a Young Short Tear Break-up Time Dry Eye: Case-control study", Medicine, vol. 98, Issue 40, pp. 1-6, 2019.
U.S. Unpublished Patent, U.S. Appl. No. 18/871,664, filed Dec. 4, 2024, 103 pages.
Liu et al., "Tutorial on Modern Rock and Mineral Analytic Experiments", Geological Press, 9 pages., Oct. 31, 2015.
Krick et al. "Temperature - DependentDynamics of Push-Pull Rotor SystemsBased on Acridinylidene CyanoaceticEsters", European Journal of Organic Chemistry, pp. 5141-5146, Jul. 26, 2017.
Ma et al., "Studies on K2CO3—Catalyzed 1,4 —Addition of 1,2-Allenic Ketones with Diethyl Malonate: Controlled Selective Synthesis of β, γ-Unsaturated Enones and α-Pyrones", Journal of Organic Chemistry, vol. 68, pp. 8996-9002, Oct. 24, 2003.
Maas et al., "Dication Ethers- 10. Stable Dipoles from A Bis-Acridinium Ether Salt and Cyclic Beta-Diketonates", Tetrahedron, vol. 41, No. 20, pp. 4529-4536, 1985.

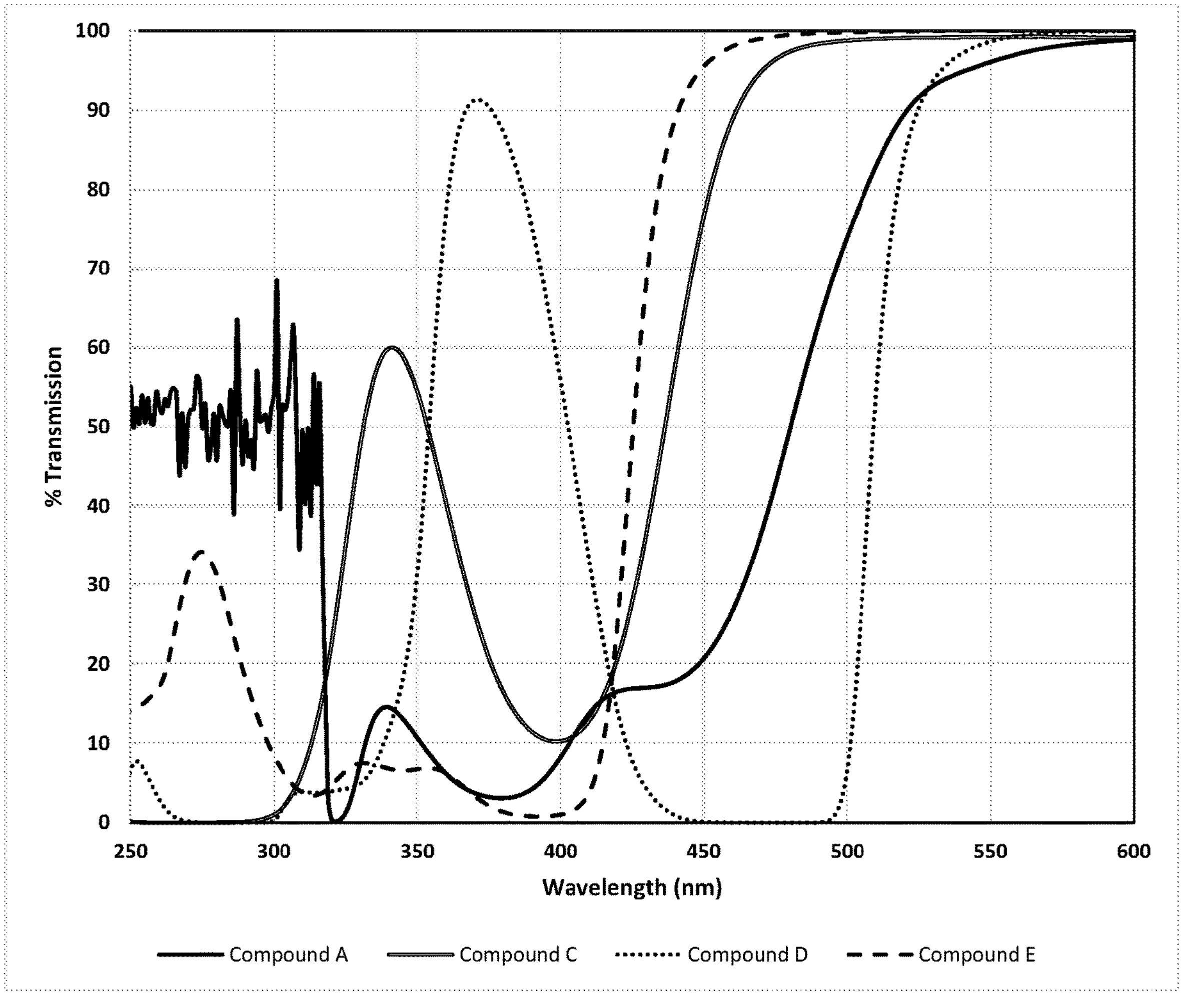
FIG. 1 UV-VIS Transmission Spectra of 0.2 mM solutions of Compounds (A), (C), (D), and (E) in methanol

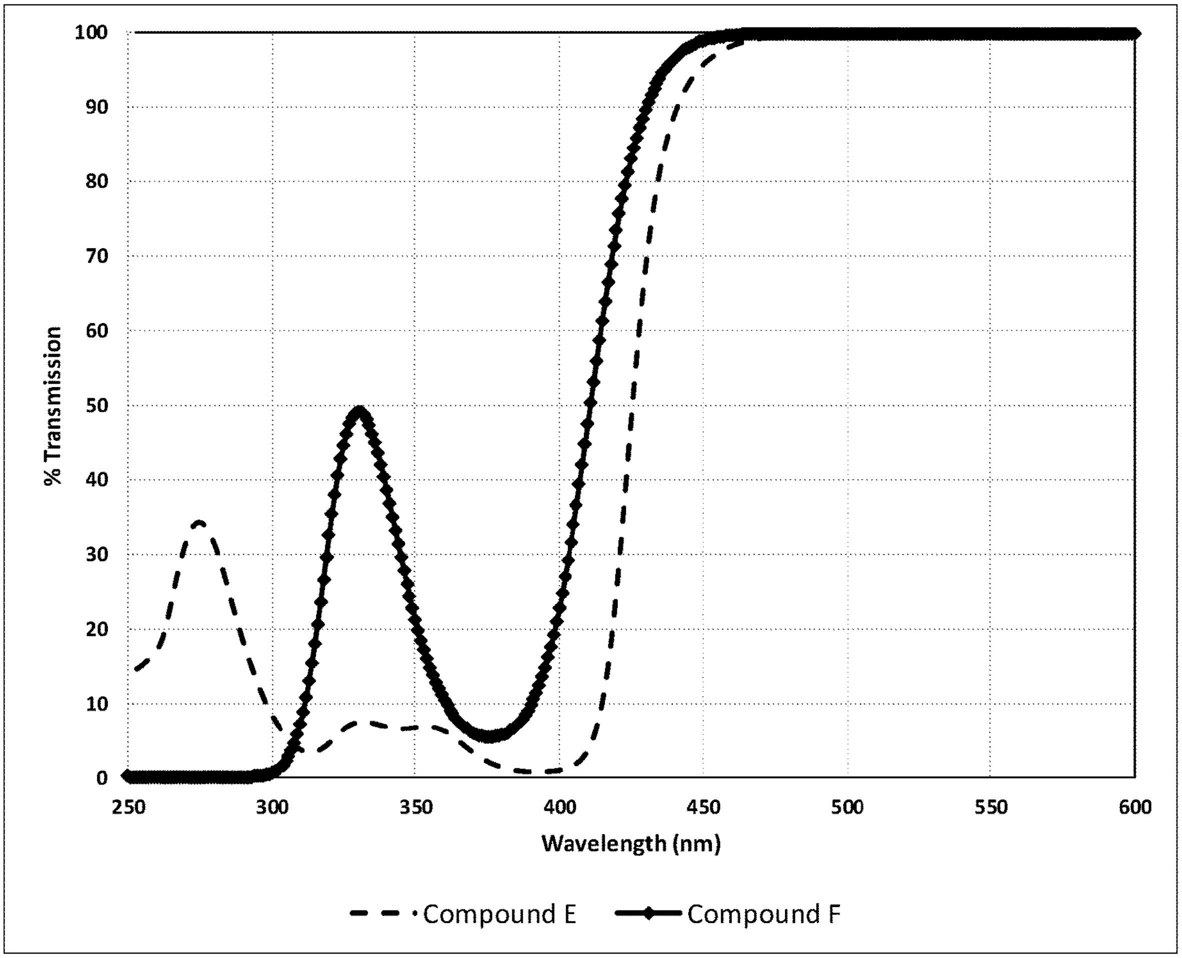
FIG. 2 UV-VIS Transmission Spectra of 0.2 mM solutions of Compounds (E) and (F) in methanol

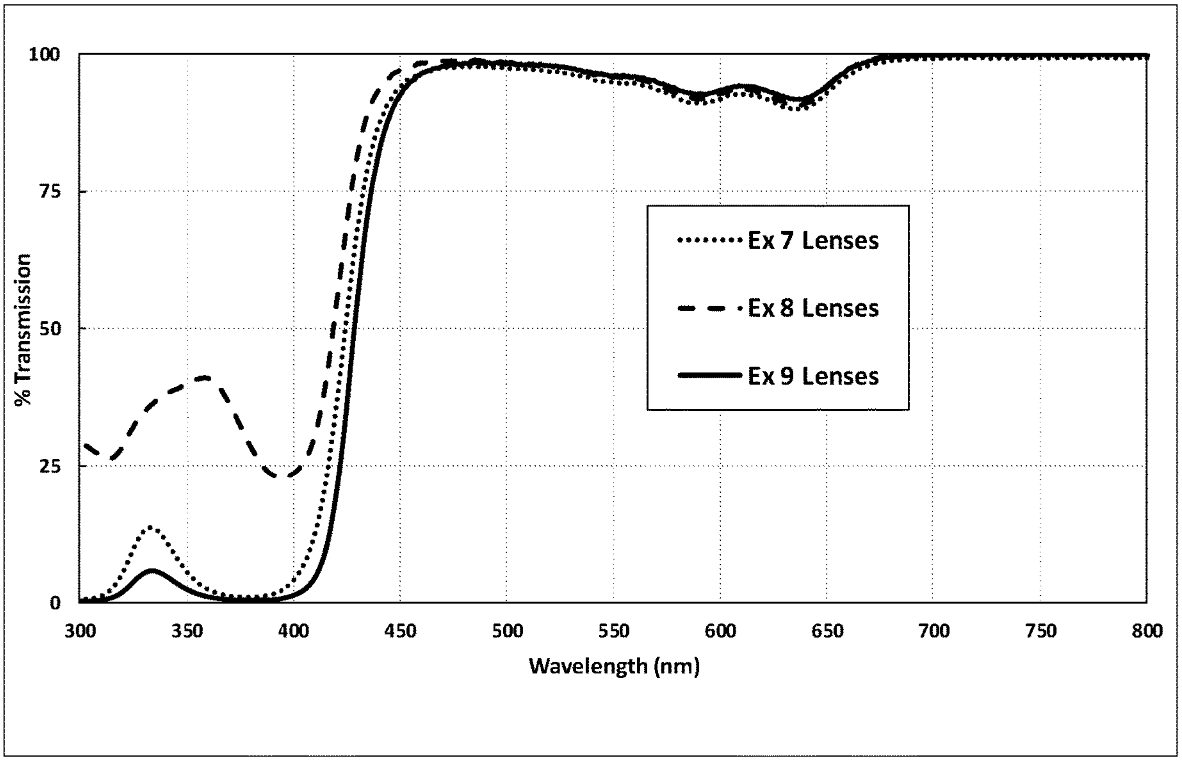
FIG. 3 – UV-VIS Transmission Spectrum of Silicone Hydrogel Contact Lenses from Examples 7, 8, and 9

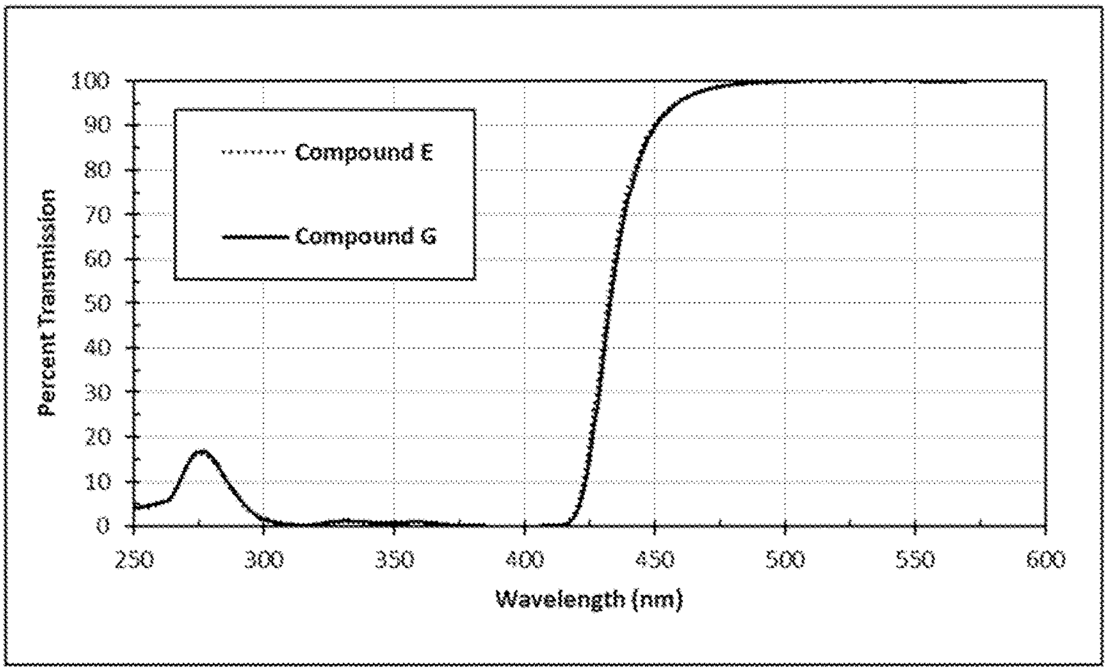
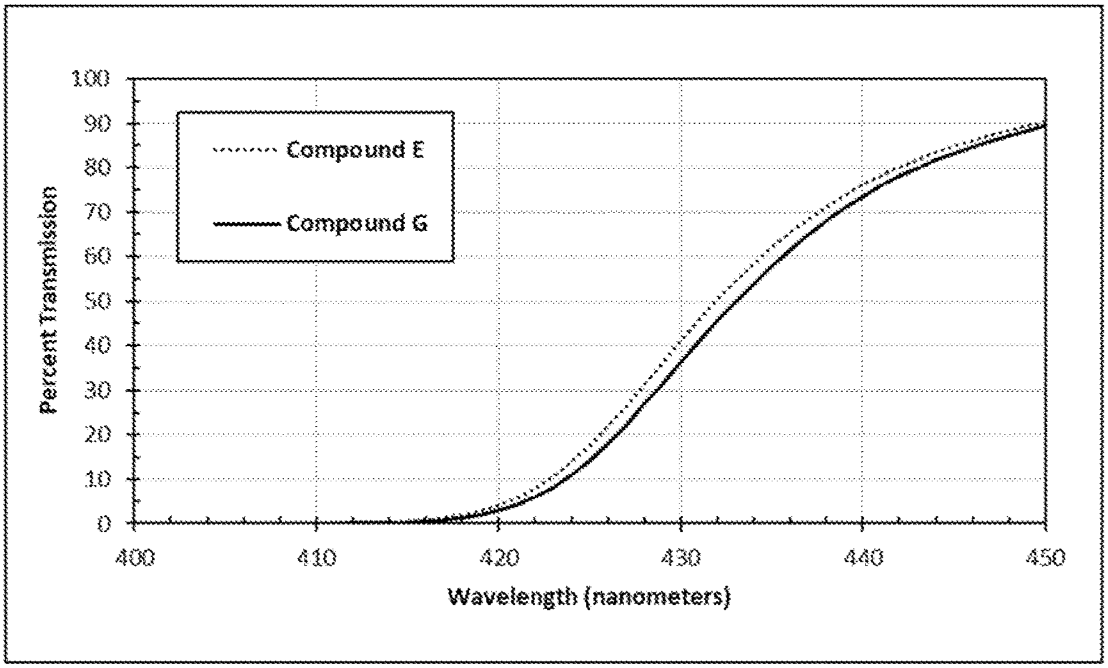
FIG. 4 - UV-VIS Transmission spectrum of Compounds E and G in 0.2 mM dichloromethane

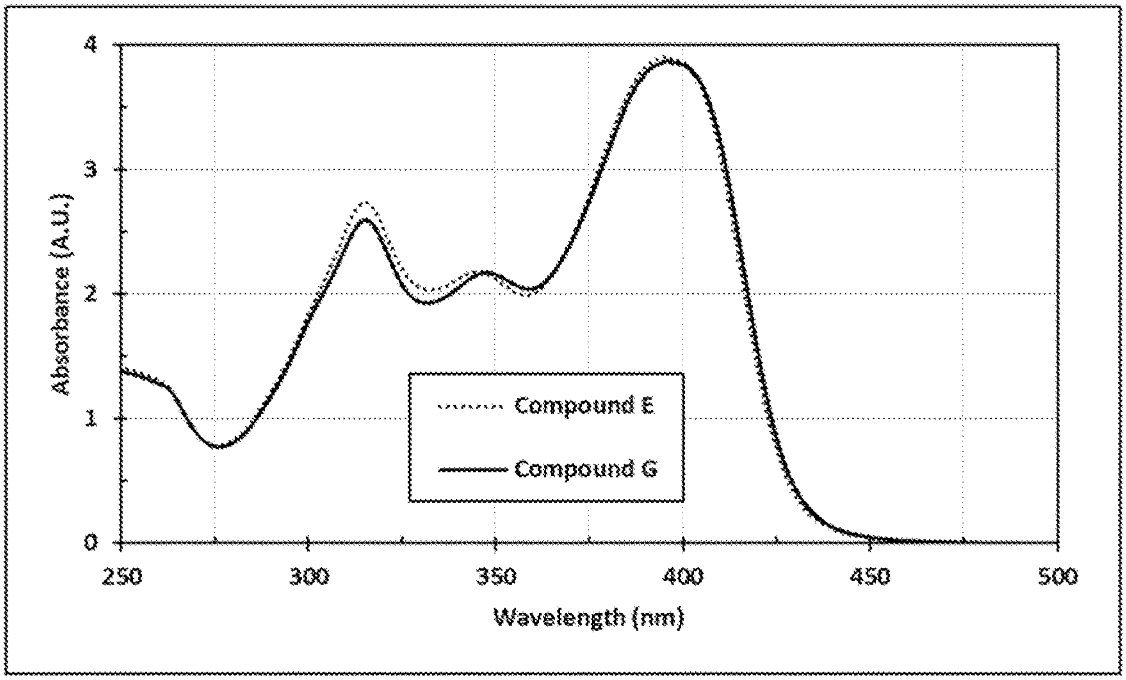
FIG. 5 - UV-VIS Absorbance spectrum of Compounds E and G in 0.2 mM dichloromethane

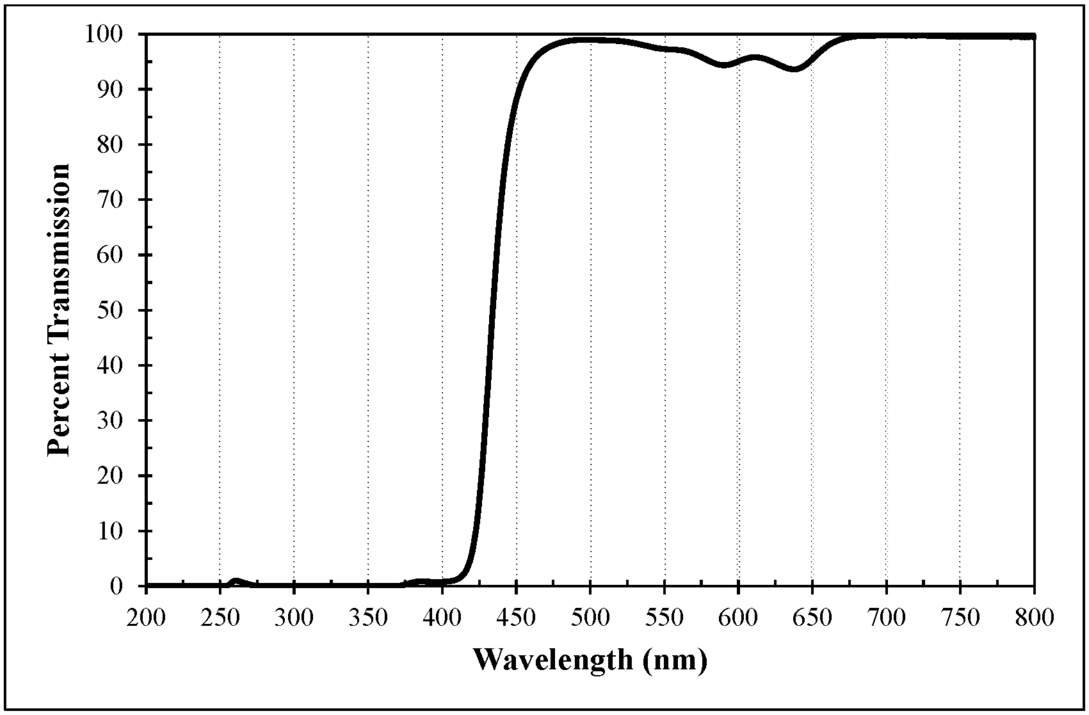
FIG. 6 – UV-VIS Transmission Spectrum of Example 11 Lenses in Packing Solution

POLYMERIZABLE FUSED TRICYCLIC COMPOUNDS AS ABSORBERS OF UV AND VISIBLE LIGHT

RELATED APPLICATIONS

This application is a continuation-in-part of U.S. patent application Ser. No. 16/883,199, filed May 26, 2020, which claims priority to U.S. Provisional Patent Application Ser. No. 62/867,963, filed Jun. 28, 2019, and this application claims priority to U.S. Provisional Patent Application Ser. No. 63/265,706, filed Dec. 20, 2021, each of said applications being incorporated herein by reference in their entirety.

FIELD OF THE INVENTION

The invention relates to UV and/or visible light absorbers. More particularly, the invention relates to compounds with polymerizable functionality that absorb various wavelengths of UV and/or visible light, such as high energy visible light, and yet are visibly transparent when incorporated in an article. Thus, the compounds may be used in polymeric articles, including biomedical devices, such as ophthalmic devices.

BACKGROUND OF THE INVENTION

High energy light from the sun, such as UV light and high-energy visible light, is known to be responsible for cellular damage. While most of the radiation below 280 nm in wavelength is absorbed by the earth's atmosphere, photons possessing wavelengths ranging between 280 and 400 nm have been associated with several ocular disorders including corneal degenerative changes, and age-related cataract and macular degeneration. (See Statement on Ocular Ultraviolet Radiation Hazards in Sunlight, American Optometric Association, Nov. 10, 1993). The human cornea absorbs some radiation up to 320 nm in wavelength (30% transmission) (Doutch, J. J., Quantock, A. J., Joyce, N. C., Meek, K. M, Biophys. J, 2012, 102, 1258-1264), but is inefficient in protecting the back of the eye from radiation ranging from 320 to 400 nm in wavelength.

Contact lens standards define the upper UV radiation wavelength at 380 nm. The current Class I UV absorbing criteria defined by the American Optometric Association require >99% of the radiation between 280 and 315 nm (UV B) and >90% of the 316 to 380 nm (UV A) radiation to be absorbed by the contact lens. While the criteria effectively address protection of the cornea (<1% UV B transmittance), there is little attention paid to the lower energy UV radiation (>380<400 nm) associated with retinal damage (Ham, W. T, Mueller, H. A., Sliney, D. H. Nature 1976; 260(5547):153-5) or to high energy visible radiation.

High energy-visible (HEV) radiation may cause visual discomfort or circadian rhythm disruption. For example, computer and electronic device screens, flat screen televisions, energy efficient lights, and LED lights are known to generate HEV light. Prolonged exposure to such sources of HEV light may cause eye strain. Viewing HEV light emitting devices at night is also postulated to disrupt the natural circadian rhythm leading, for example, to inadequate sleep.

Absorption of high energy light radiation before it reaches the eye continues to be a desirable goal in the ophthalmics field. However, the extent to which a particular wavelength range is absorbed is also important. For instance, in the UV A and UV B ranges, it may be desirable to absorb as much radiation as possible. On the other hand, since HEV light forms a part of the visible spectrum, complete absorption of HEV light may negatively affect vision. With HEV light, therefore, partial absorption may be more desirable.

There is a need for materials that provide targeted absorption of undesirable wavelengths of high energy radiation, and that are processable into functional products. Compounds that absorb or attenuate high energy radiation, when used in ophthalmic devices, can help protect the cornea, as well as the interior cells in the ocular environment, from degradation, strain, and/or circadian rhythm disruption.

SUMMARY OF THE INVENTION

The invention relates to high energy light absorbing compounds that absorb UV and/or high energy visible (HEV) light while substantially transmitting (e.g., greater than 80% transmission) at wavelengths longer than about 450 nm. The compounds are therefore effective at providing targeted absorption of high energy light, such as UV (UVA and UVB), low energy UV light (385 nm to 400 nm), or HEV light (e.g., 400 to 450 nm).

The compounds are also polymerizable and are generally compatible with other raw materials, as well as the polymerization and processing conditions that are typically used for making ophthalmic devices such as soft contact lenses. The compounds can therefore be readily covalently incorporated into the final product without the need for significant modification of existing manufacturing processes and equipment.

Accordingly, in one aspect the invention provides a fused tricyclic compound of formula formula I

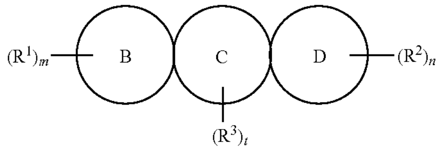

wherein m, n, and t are independently 0, 1, 2, 3, or 4; $R^1$ $R^2$, and $R^3$ are independently at each occurrence H, an optional substituent, or —Y—$P_g$, or two adjacent $R^1$, $R^2$, or $R^3$ groups, together with the atoms to which they are attached, combine to form a cycloalkyl or aryl ring optionally substituted with —Y—$P_g$; B represents a 5, 6, or 7 membered ring which is aromatic, saturated, or partially unsaturated optionally having up to three heteroatoms independently selected from O, S, N, and $NR^6$, wherein $R^6$ is H, $C_1$-$C_6$ alkyl, cycloalkyl, heterocycloalkyl, aryl, heteroaryl, or Y—$P_g$; one of C and D represents a 5, 6, or 7 membered ring which is aromatic, saturated, or partially unsaturated optionally having up to three heteroatoms independently selected from O, S, N, and $NR^6$, and the other of C and D is a 6 membered saturated or partially unsaturated heterocycloalkyl ring having at least one ring carbon atom and at least one heterogroup independently selected from O, S, $NR^6$, SO, or $SO_2$, the heterocycloalkyl ring being substituted at one ring carbon atom with a group of formula =C(EWG)($R^7$), wherein $R^7$ is EWG or —C(=O)-T-Y—$P_g$, and EWG at each occurrence is independently an electron withdrawing group; $P_g$ at each occurrence is independently a polymerizable group; Y at each occurrence is independently a linking group; and T at each occurrence is independently a bond, O, or $NR^6$, wherein the compound of formula I contains at least one $P_g$ group.

In another aspect, the invention provides an ophthalmic device that is a free radical reaction product of a reactive mixture comprising: one or more monomers suitable for making the ophthalmic device; and a compound of formula I as described herein.

In a further aspect, the invention provides an ophthalmic device comprising a polymeric network and a non-reactive polymer comprising repeating units derived from a compound of formula I as described herein.

BRIEF DESCRIPTION OF FIGURES

FIG. 1 shows UV-VIS Transmission Spectra of 0.2 mM solutions of example Compounds (A), (C), (D), and (E) in methanol.

FIG. 2 shows UV-VIS Transmission Spectra of 0.2 mM solutions of example Compounds (E) and (F) in methanol.

FIG. 3 shows UV-VIS Transmission Spectrum of Silicone Hydrogel Contact Lenses from Examples 7, 8, and 9.

FIG. 4 shows a UV-VIS transmission spectrum of Compound G from Example 10 in 0.2 mM dichloromethane along with Compound E.

FIG. 5 shows the corresponding absorbance spectra of the compounds in FIG. 4.

FIG. 6 shows a UV-VIS transmission spectrum of a contact lens prepared according to Example 11.

DETAILED DESCRIPTION OF THE INVENTION

It is to be understood that the invention is not limited to the details of construction or process steps set forth in the following description. The invention is capable of other embodiments and of being practiced or being carried out in various ways using the teaching herein.

As noted above, in one aspect, the invention provides UV and/or visible light (such as HEV) absorbing compounds. The compounds contain polymerizable functionality. It has been discovered that ophthalmic devices that absorb UV light and/or visible light (such as HEV light) can be readily prepared as described herein.

The compounds of the invention may successfully absorb UV (UVA, UVB), and/or visible light, while transmitting in other portions of the visible spectrum. The compounds are suitable for incorporation in a variety of products, including biomedical devices and ophthalmic devices.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]n, is used to depict the number of repeating units in a polymer's chemical formula, the formula should be interpreted to represent the number average molecular weight of the macromolecule.

The term "individual" includes humans and vertebrates.

The term "biomedical device" refers to any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, and ophthalmic devices such as intraocular lenses and contact lenses. The biomedical devices may be ophthalmic devices, particularly contact lenses, most particularly contact lenses made from silicone hydrogels or conventional hydrogels.

The term "ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

The term "ophthalmic device" refers to any optical device relating to the eye and includes devices which reside in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include spectacle lenses, sunglass lenses, soft contact lenses, hard contact lenses, hybrid contact lenses, intraocular lenses, and overlay lenses. The ophthalmic device may comprise a contact lens.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The biomedical devices, ophthalmic devices, and lenses of the present invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, for example a carbon-carbon double bond which can polymerize when subjected to radical polymerization initiation conditions. Non-limiting examples of free radical polymerizable groups include (meth)acrylates, styrenes, vinyl ethers, (meth)acrylamides, N-vinyllactams, N-vinylamides, O-vinylcarbamates, O-vinylcarbonates, and other vinyl groups. Preferably, the free radical polymerizable groups comprise (meth)acrylate, (meth)acrylamide, N-vinyl lactam, N-vinylamide, and styryl functional groups, and mixtures of any of the foregoing. More preferably, the free radical polymerizable groups comprise (meth)acrylates, (meth)acrylamides, and mixtures thereof. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that may swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the resultant polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as biomedical devices, ophthalmic devices, and contact lenses made therefrom. The reactive mixture may comprise reactive components such as monomers, macromers, prepolymers, cross-linkers, and initiators, additives such as wetting agents, polymers, dyes, light absorbing compounds such as UV absorbers, pigments, photochromic compounds, pharmaceutical compounds, and/or nutraceutical compounds, any of which may be polymerizable or non-polymerizable but are capable of being retained within the resulting biomedical device (e.g., contact lens). The reactive mixture may also contain other components which are intended to be removed from the device prior to its use, such as diluents. It will be appreciated that a wide range of additives may be added based upon the contact lens which is made and its intended use.

Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as $—CH_2—$, $—CH_2CH_2—$, $—CH_2CH_2CH_2—$, $—CH_2CH(CH_3)CH_2—$, and $—CH_2CH_2CH_2CH_2—$.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as $—CF_3—$ or $—CF_2CF_3—$. "Haloalkylene" means a divalent haloalkyl group, such as $—CH_2CF_2—$.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as $—CH_2CH_2NH—$.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., $-[Si—O]_n—$, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula $R_3Si—$ and "siloxy" refers to a structure of formula $R_3Si—O—$, where each R in silyl or siloxy is independently selected from trimethylsiloxy, $C_1$-$C_8$ alkyl (preferably $C_1$-$C_3$ alkyl, more preferably ethyl or methyl), and $C_3$-$C_8$ cycloalkyl.

"Alkyleneoxy" refers to groups of the general formula $-(alkylene-O)_p—$ or $—(O-alkylene)_p-$, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., $HO—[CH_2CH_2O]_p—$ or $CH_3O—[CH_2CH_2O]_p-$). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent $CH_2$ groups have been substituted with an oxygen atom, such as $—CH_2CH_2OCH(CH_3)CH_2—$. "Thiaalkylene" refers to an alkylene group as defined above where one or more non-adjacent $CH_2$ groups have been substituted with a sulfur atom, such as $—CH_2CH_2SCH(CH_3)CH_2—$.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester ($—CO_2—$), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., $—OCF_2—$, $—OCF_2CF_2—$, $—OCF_2CH_2—$), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include $C_1$-$C_8$ alkylene (preferably $C_2$-$C_6$ alkylene) and $C_1$-$C_8$ oxaalkylene (preferably $C_2$-$C_6$ oxaalkylene), each of which is optionally substituted with 1 or 2 groups independently selected from hydroxyl and siloxy. Preferred linking groups also include carboxylate, amide, $C_1$-$C_8$ alkylene-carboxylate-$C_1$-$C_8$ alkylene, or $C_1$-$C_8$ alkylene-amide-$C_1$-$C_8$ alkylene.

When the linking group is comprised of combinations of moieties as described above (e.g., alkylene and cycloalkylene), the moieties may be present in any order. For instance, if in Formula A below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula A, L is indicated as being alkylene-cycloalkylene, then Rg-L is preferably Rg-alkylene-cycloalkylene-.

The term "electron withdrawing group" (EWG) refers to a chemical group which withdraws electron density from the atom or group of atoms to which the electron withdrawing group is attached. Examples of EWGs include, but are not limited to, cyano, amide, ester, keto, or aldehyde. A preferred EWG is cyano (CN).

The terms "light absorbing compound" refers to a chemical material that absorbs light within the visibile spectrum (e.g., in the 380 to 780 nm range). A"high energy radiation absorber," "UV/HEV absorber," or "high energy light absorbing compound" is a chemical material that absorbs various wavelengths of ultraviolet light, high energy visible light, or both. A material's ability to absorb certain wavelengths of light can be determined by measuring its UV/Vis transmission spectrum. Compounds that exhibit no absorption at a particular wavelength will exhibit substantially 100 percent transmission at that wavelength. Conversely, compounds that completely absorb at a particular wavelength will exhibit substantially 0% transmission at that wavelength. If the amount of a material's transmission is indicated as a percentage for a particular wavelength range, it is to be understood that the material exhibits the percent transmission at all wavelengths within that range.

When the compounds described herein contain olefinic double bonds or other centers of geometric asymmetry, and unless otherwise specified, it is intended that the compounds include the cis, trans, Z- and E-configurations. Likewise, all tautomeric and salt forms are also intended to be included.

The term "optional substituent" means that a hydrogen atom in the underlying moiety is optionally replaced by a substituent. Any substituent may be used that is sterically practical at the substitution site and is synthetically feasible. Identification of a suitable optional substituent is well within the capabilities of an ordinarily skilled artisan. Examples of an "optional substituent" include, without limitation, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, or $SO_3Na$, wherein $R^4$ and $R^5$ are independently H or $C_1$-$C_6$ alkyl. The foregoing substituents may be optionally substituted by an optional substituent (which, unless otherwise indicated, is preferably not further substituted). For instance, alkyl may be substituted by halo (resulting, for instance, in $CF_3$).

Unless otherwise indicated, ratios, percentages, parts, and the like are by weight.

Unless otherwise indicated, numeric ranges, for instance as in "from 2 to 10," are inclusive of the numbers defining the range (e.g., 2 and 10).

As noted above, in one aspect, the invention provides a fused tricyclic compound of formula I:

formula I

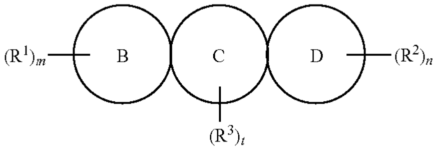

wherein m, n, and t are independently 0, 1, 2, 3, or 4; $R^1$ $R^2$, and $R^3$ are independently at each occurrence H, an optional substituent, or —Y—$P_g$, or two adjacent $R^2$, or $R^3$ groups, together with the atoms to which they are attached, combine to form a cycloalkyl or aryl ring optionally substituted with —Y—$P_g$; B represents a 5, 6, or 7 membered ring which is aromatic, saturated, or partially unsaturated optionally having up to three heteroatoms independently selected from O, S, N, and $NR^6$, wherein $R^6$ is H, $C_1$-$C_6$ alkyl, cycloalkyl, heterocycloalkyl, aryl, heteroaryl, or Y—$P_g$; one of C and D represents a 5, 6, or 7 membered ring which is aromatic, saturated, or partially unsaturated optionally having up to three heteroatoms independently selected from O, S, N, and $NR^6$, and the other of C and D is a 6 membered saturated or partially unsaturated heterocycloalkyl ring having at least one ring carbon atom and at least one heterogroup independently selected from O, S, $NR^6$, SO, or $SO_2$, the heterocycloalkyl ring being substituted at one ring carbon atom with a group of formula =C(EWG)($R^7$), wherein $R^7$ is EWG or —C(=O)-T-Y—$P_g$, and EWG at each occurrence is independently an electron withdrawing group; $P_g$ at each occurrence is independently a polymerizable group; Y at each occurrence is independently a linking group; and T at each occurrence is independently a bond, O, or $NR^6$, wherein the compound of formula I contains at least one $P_g$ group.

Formula I-1. Compounds of formula I may include compounds of formula I-1, which are compounds of formula I wherein the heteroatom in the 6 membered saturated or partially unsaturated heterocycloalkyl ring of C or D is S.

I-2. Compounds of formula I may include compounds of formula 1-2, which are compounds of formula I wherein the heteroatom in the 6 membered saturated or partially unsaturated heterocycloalkyl ring of C or D is O.

I-3. Compounds of formula I may include compounds of formula 1-3, which are compounds of formula I wherein the heteroatom in the 6 membered saturated or partially unsaturated heterocycloalkyl ring of C or D is $NR^6$, preferably NH or N-alkyl.

I-4. Compounds of formula I may include compounds of formula 1-4, which are compounds of formula I wherein the heteroatom in the 6 membered saturated or partially unsaturated heterocycloalkyl ring of C or D is SO.

I-5. Compounds of formula I may include compounds of formula 1-5, which are compounds of formula I wherein the heteroatom in the 6 membered saturated or partially unsaturated heterocycloalkyl ring of C or D is $SO_2$.

I-6. Compounds of formulae I, I-1, I-2, I-3, I-4, and I-5 may include compounds of formula I-6, which are compounds of formula I, I-1, I-2, I-3, I-4, or I-5 wherein m, n, and t are independently 0 or 1, or alternatively each is O.

I-7. Compounds of formulae I, I-1, I-2, I-3, I-4, and I-5 may include compounds of formula I-7, which are compounds of formula I, I-1, I-2, I-3, I-4, or I-5 wherein $R^1$ is H, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, or $SO_3Na$, wherein $R^4$ and $R^5$ are independently H or $C_1$-$C_6$ alkyl.

I-8. Compounds of formulae I, I-1, I-2, I-3, I-4, I-5, and I-7 may include compounds of formula I-8, which are compounds of formula I, I-1, I-2, I-3, I-4, I-5, or I-7 wherein $R^2$ and $R^3$ are independently H, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, or $SO_3Na$, wherein $R^4$ and $R^5$ are independently H or $C_1$-$C_6$ alkyl.

I-9. Compounds of formulae I, I-1, I-2, I-3, I-4, I-5, I-6, I-7 and I-8 may include compounds of formula I-9, which are compounds of formula I, I-1, I-2, I-3, I-4, I-5, I-6, I-7 or I-8 wherein $R^6$ is H, or $C_1$-$C_6$ alkyl. Preferably, $R^6$ in the group T is H.

I-10. Compounds of formulae I, I-1, I-2, I-3, I-4, I-5, I-6, I-7, I-8, and I-9 may include compounds of formula I-10, which are compounds of formula I, I-1, I-2, I-3, I-4, I-5, I-6, I-7, I-8, or 1-9 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components which may be used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

I-11. Compounds of formulae I, I-1, I-2, I-3, I-4, I-5, I-6, I-7, I-8, I-9, and I-10 may include compounds of formula I-11, which are compounds of formula I, I-1, I-2, I-3, I-4, I-5, I-6, I-7, I-8, I-9, or I-10 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene ($-CH_2CH_2-$).

I-12. Compounds of formulae I, I-1, I-2, I-3, I-4, I-5, I-6, I-7, I-8, I-9, I-10, and I-11 may include compounds of formula I-12, which are compounds of formula I, I-1, I-2, I-3, I-4, I-5, I-6, I-7, I-8, I-9, I-10, or I-11 wherein T is a bond or is $NR^6$ (e.g., NH).

I-13. Compounds of formulae I, I-1, I-2, I-3, I-4, I-5, I-6, I-7, I-8, I-9, I-10, I-11, and I-12 may include compounds of formula I-13, which are compounds of formula I, I-1, I-2, I-3, I-4, I-5, I-6, I-7, I-8, I-9, I-10, I-11, or I-12 wherein EWG at each occurrence is independently cyano, amide, ester, keto, or aldehyde.

I-14. Compounds of formulae I, I-1, I-2, I-3, I-4, I-5, I-6, I-7, I-8, I-9, I-10, I-11, I-12, and I-13 may include compounds of formula I-14, which are compounds of formula I, I-1, I-2, I-3, I-4, I-5, I-6, I-7, I-8, I-9, I-10, I-11, I-12 or I-13 wherein B represents a 6 membered aromatic ring optionally having one heteroatom selected from O, S, and N.

I-15. Compounds of formulae I, I-1, I-2, I-3, I-4, I-5, I-6, I-7, I-8, I-9, I-10, I-11, I-12, I-13, and I-14 may include compounds of formula I-15, which are compounds of formula I, I-1, I-2, I-3, I-4, I-5, I-6, I-7, I-8, I-9, I-10, I-11, I-12, I-13, or I-14 wherein D represents a 6 membered aromatic ring optionally having one heteroatom selected from O, S, and N.

I-16. Compounds of formulae I, I-1, I-2, I-3, I-4, I-5, I-6, I-7, I-8, I-9, I-10, I-11, I-12, I-13, I-14, and I-15 may include compounds of formula I-16, which are compounds of formula I, I-1, I-2, I-3, I-4, I-5, I-6, I-7, I-8, I-9, I-10, I-11, I-12, I-13, I-14, or I-15 wherein ring C is a 6 membered saturated heterocycloalkyl ring having at least one ring carbon atom and one heterogroup selected from O, S, $NR^6$, SO, or $SO_2$, the heterocycloalkyl ring being substituted at one ring carbon atom with a group of formula $=C(EWG)(R^7)$.

I-17. Compounds of formulae I, I-1, I-2, I-3, I-4, I-5, I-6, I-7, I-8, I-9, I-10, I-11, I-12, I-13, I-14, I-15, and I-16 may include compounds of formula I-17, which are compounds of formula I, I-1, I-2, I-3, I-4, I-5, I-6, I-7, I-8, I-9, I-10, I-11, I-12, I-13, I-14, I-15, or I-16 wherein $R^7$ is EWG.

I-18. Compounds of formulae I, I-1, I-2, I-3, I-4, I-5, I-6, I-7, I-8, I-9, I-10, I-11, I-12, I-13, I-14, I-15, and I-16 may include compounds of formula I-18, which are compounds of formula I, I-1, I-2, I-3, I-4, I-5, I-6, I-7, I-8, I-9, I-10, I-11, I-12, I-13, I-14, I-15, or I-16 wherein $R^7$ is $-C(=O)$-T-Y$-P_g$.

I-19. Compounds of formulae I, I-1, I-2, I-3, I-4, I-5, I-6, I-7, I-8, I-9, I-10, I-11, I-12, I-13, I-14, I-15, I-16, I-17, and I-18 may include compounds of formula I-19, which are compounds of formula I, I-1, I-2, I-3, I-4, I-5, I-6, I-7, I-8, I-9, I-10, I-11, I-12, I-13, I-14, I-15, I-16, I-17, or I-18 wherein the compound contains two Y$-P_g$ groups.

I-20. Compounds of formulae I, I-1, I-2, I-3, I-4, I-5, I-6, I-7, I-8, I-9, I-10, I-11, I-12, I-13, I-14, I-15, I-16, I-17, and I-18 may include compounds of formula I-20, which are compounds of formula I, I-1, I-2, I-3, I-4, I-5, I-6, I-7, I-8, I-9, I-10, I-11, I-12, I-13, I-14, I-15, I-16, I-17, or I-18 wherein the compound contains one Y$-P_g$ group.

Compounds of formula I may include compounds of formula II:

II

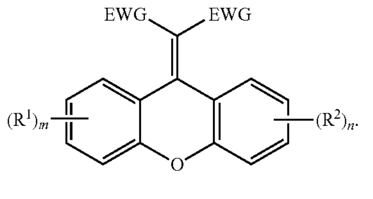

wherein m and n are independently 0, 1, 2, 3, or 4; $R^1$ and $R^2$ are independently at each occurrence H, an optional substituent, or $-Y-P_g$, or two adjacent $R^1$ or $R^2$ groups, together with the atoms to which they are attached, combine to form a cycloalkyl or aryl ring optionally substituted with $-Y-P_g$; and EWG at each occurrence is independently an electron withdrawing group; $P_g$ at each occurrence is independently a polymerizable group; Y at each occurrence is independently a linking group; wherein the compound of formula II contains at least one $P_g$ group.

Formula II-1. Compounds of formula II may include compounds of formula II-1, which are compounds of formula II wherein m and n are independently 0 or 1, or alternatively one is 0 and the other is 1.

II-2. Compounds of formulae II and II-1 may include compounds of formula II-2, which are compounds of formula II or II-1 wherein $R^1$ is H, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, or $SO_3Na$, wherein $R^4$ and $R^5$ are independently H or $C_1$-$C_6$ alkyl.

II-3. Compounds of formulae II, II-1, and II-2 may include compounds of formula II-3, which are compounds of formula II, II-1, or II-2 wherein $R^2$ is —Y—$P_g$.

II-4. Compounds of formulae II, II-1, II-2, and II-3 may include compounds of formula II-4, which are compounds of formula II, II-1, II-2, or II-3 wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. The polymerizable group allows the compounds of the invention to form covalent bonds when reacted with monomers, crosslinking agents, and other components which may be used in making polymeric devices. The compatibility of the compounds with the reactive mixture can be controlled via the selection of the polymerizable group (and the linking group). Preferred polymerizable groups include (meth)acrylate or (meth)acrylamide. A more preferred polymerizable group is methacrylate.

II-5. Compounds of formulae II, II-1, II-2, II-3, and II-4 may include compounds of formula II-5, which are compounds of formula II, II-1, II-2, II-3, or II-4 wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is oxa-$C_1$-$C_8$ alkylene, especially oxapropylene II-6. Compounds of formulae II, II-1, II-2, II-3, II-4, and II-5 may include compounds of formula II-6, which are compounds of formula II, II-1, II-2, II-3, II-4, or II-5 wherein EWG at each occurrence is independently cyano, amide, ester, keto, or aldehyde. Preferably EWG at each occurrence is cyano.

II-7. Compounds of formulae II, II-1, II-2, II-3, II-4, II-5, and II-6 may include compounds of formula II-7, which are compounds of formula II, II-1, II-2, II-3, II-4, II-5, or II-6 wherein the compound contains one Y—$P_g$ group.

II-8. Compounds of formulae II, II-1, II-2, II-3, II-4, II-5, II-6, and II-7 may include compounds of formula II-8, which are compounds of formula II, II-1, II-2, II-3, II-4, II-5, II-6, II-7 wherein m is 0 and $R^2$ is —Y—$P_g$.

Compounds of the invention, including the compounds of formula II, may exhibit a molar extinction coefficient at the visible light absorption maximum of at least 5000, or at least 7500, or at least 10,000, or at least 12,500, or at least 15,000, or at least 17,500, or at least 19,000. Molar extinction coefficient is an intrinsic property of a material and may be calculated from absorbance data using the Beer-Lambert law. The unit is typically $L \cdot mol^{-1} \cdot cm^{-1}$.

Compounds of formula I-z may be excluded from the compounds of formula I:

formula I-z

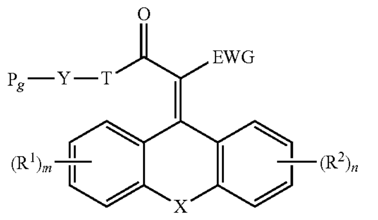

wherein X is O, S, $NR^6$, SO, or $SO_2$, and wherein $R^1$, $R^2$, n, m, EWG, T, Y, $P_g$ and $R^6$ are as defined above for compounds of formula I.

Compounds of formula I and its sub-formulae (I, I-1, I-2, I-3, I-4, I-5, I-6, I-7, I-8, I-9, I-10,I-11,I-12,I-13,I-14,I-15, I-16, I-17, I-18, I-19, I-20, II, II-1, II-2, II-3, II-4, II-5, II-6, II-7, and II-8) may include the compounds shown in Table A, which are compounds of formula I, or any of its sub-formulae, having the structures:

TABLE A

| | |
|---|---|
| 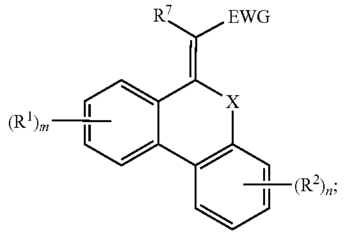 | III |
| 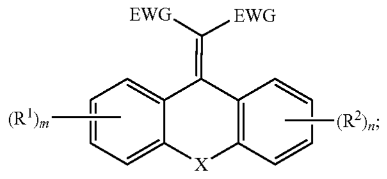 | IV |
| 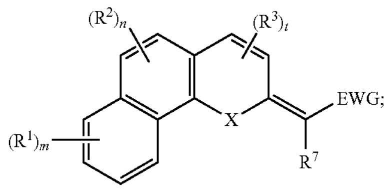 | V |
| 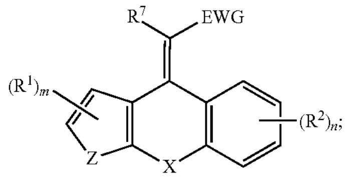 | VI |
| 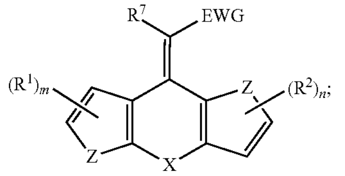 | VII |
| 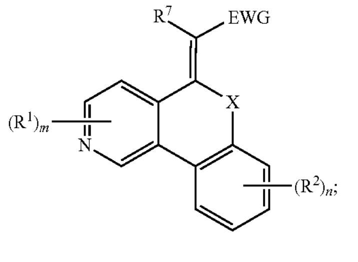 | VIII |

TABLE A-continued

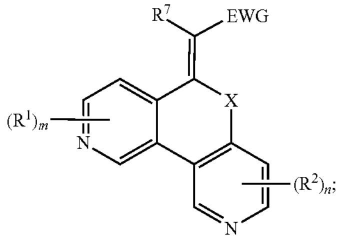
IX

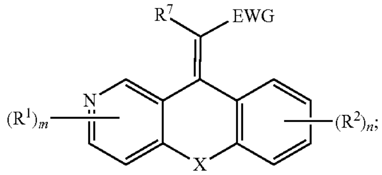
X

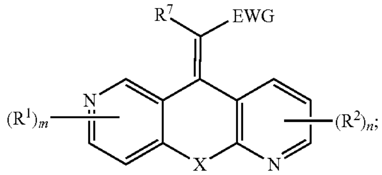
XI

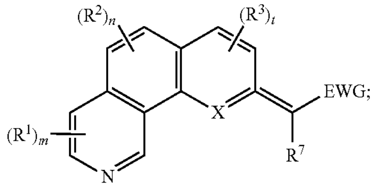
XII

TABLE A-continued

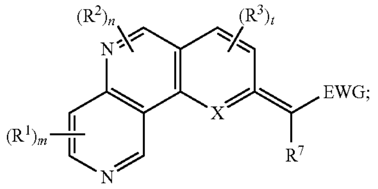
XIII

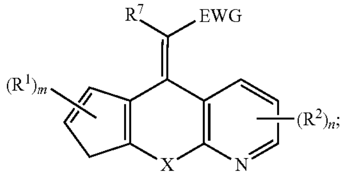
XIV
and

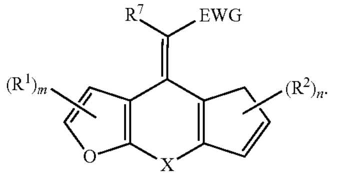
XV

In the structures shown in Table A, X is independently O, S, $NR^6$, SO, or $SO_2$, and Z is independently O, S, or $NR^6$.

Specific examples of compounds of formulae I and II include, but are not limited to, the compounds shown in Table B.

TABLE B

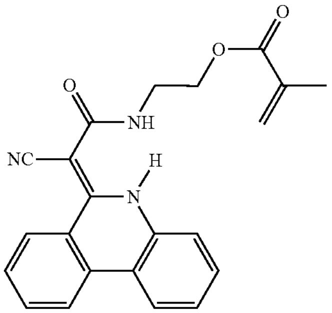 [SMILES: C=C(C)C(=O)OCCNC(=O)/C(C#N)=C1\Nc2ccccc2-c2ccccc21]
(Z)-2-(2-cyano-2-(phenanthridin-6(5H)-ylidene)acetamido)ethyl methacrylate

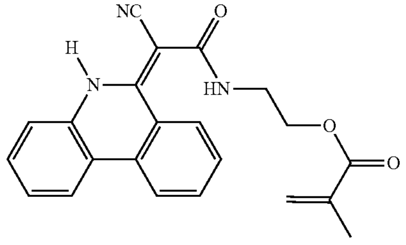 [SMILES: C=C(C)C(=O)OCCNC(=O)/C(C#N)=C1/Nc2ccccc2-c2ccccc21]
(E)-2-(2-cyano-2-(phenanthridin-6(5H)-ylidene)acetamido)ethyl methacrylate TABLE B-continued
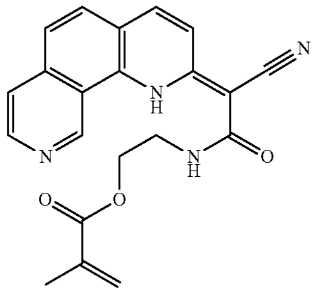 [SMILES: C=C(C)C(=O)OCCNC(=O)/C(C#N)=C1/C=Cc2ccc3ccncc3c2N1]
(Z)-2-(2-cyano-2-(1,9-phenanthrolin-2(1H)-ylidene)acetamido)ethyl methacrylate
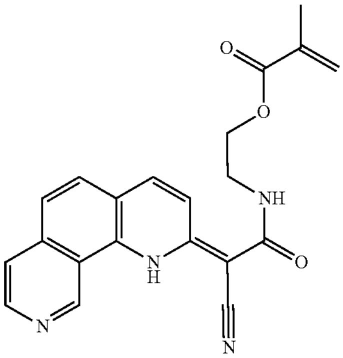 [SMILES: C=C(C)C(=O)OCCNC(=O)/C(C#N)=C1\C=Cc2ccc3ccncc3c2N1]
(E)-2-(2-cyano-2-(1,9-phenanthrolin-2(1H)-ylidene)acetamido)ethyl methacrylate
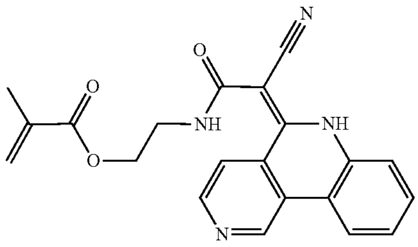 [SMILES: C=C(C)C(=O)OCCNC(=O)/C(C#N)=C1/Nc2ccccc2-c2cnccc21]
(E)-2-(2-(benzo[c][2,6]naphthyridin-5(6H)-ylidene)-2-cyanoacetamido)ethyl methacrylate
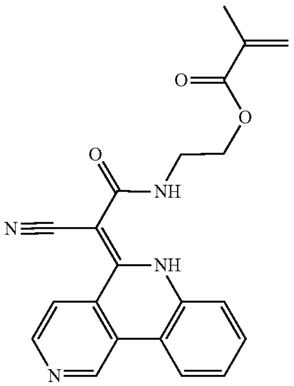 [SMILES: C=C(C)C(=O)OCCNC(=O)/C(C#N)=C1\Nc2ccccc2-c2cnccc21]
(Z)-2-(2-(benzo[c][2,6]naphthyridin-5(6H)-ylidene)-2-cyanoacetamido)ethyl methacrylate TABLE B-continued
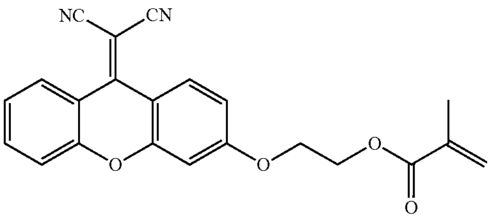 [SMILES: C=C(C)C(=O)OCCOc1ccc2c(c1)Oc1ccccc1C2=C(C#N)C#N]
2-((9-(dicyanomethylene)-9H-xanthen-3-yl)oxy)ethyl methacrylate
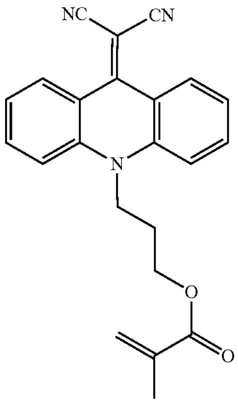 [SMILES: C=C(C)C(=O)OCCCN1c2ccccc2C(=C(C#N)C#N)c2ccccc21]
3-(9-(dicyanomethylene)acridin-10(9H)-yl)propyl methacrylate
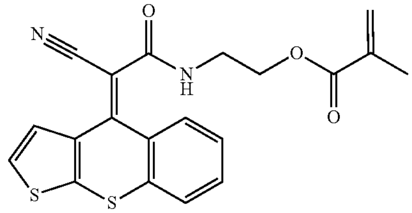 [SMILES: C=C(C)C(=O)OCCNC(=O)/C(C#N)=C1\c2ccccc2Sc2sccc21]
(E)-2-(2-cyano-2-(4H-thieno[2,3-b]thiochromen-4-ylidene)acetamido)ethyl methacrylate
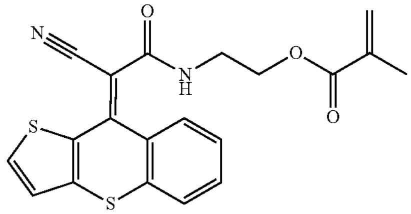 [SMILES: C=C(C)C(=O)OCCNC(=O)/C(C#N)=C1\c2ccccc2Sc2ccsc21]
(E)-2-(2-cyano-2-(9H-thieno[3,2-b]thiochromen-9-ylidene)acetamido)ethyl methacrylate
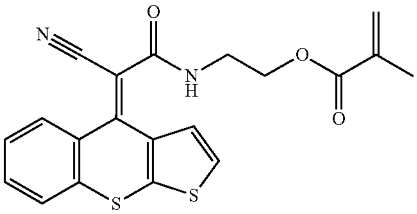 [SMILES: C=C(C)C(=O)OCCNC(=O)/C(C#N)=C1/c2ccccc2Sc2sccc21]
(Z)-2-(2-cyano-2-(4H-thieno[2,3-b]thiochromen-4-ylidene)acetamido)ethyl methacrylate TABLE B-continued

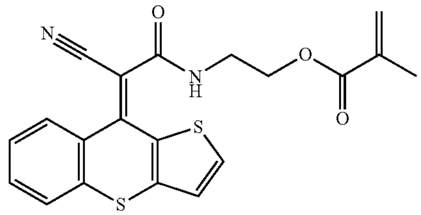 [SMILES: C=C(C)C(=O)OCCNC(=O)/C(C#N)=C1/c2ccccc2Sc2ccsc21]

(Z)-2-(2-cyano-2-(9H-thieno[3,2-b]thiochromen-9-ylidene)acetamido)ethyl methacrylate

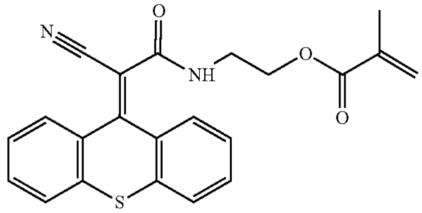 [SMILES: C=C(C)C(=O)OCCNC(=O)C(C#N)=C1c2ccccc2Sc2ccccc21]

2-(2-cyano-2-(9H-thioxanthen-9-ylidene)acetamido)ethyl methacrylate

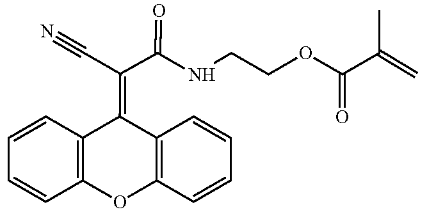 [SMILES: C=C(C)C(=O)OCCNC(=O)C(C#N)=C1c2ccccc2Oc2ccccc21]

2-(2-cyano-2-(9H-xanthen-9-ylidene)acetamido)ethyl methacrylate

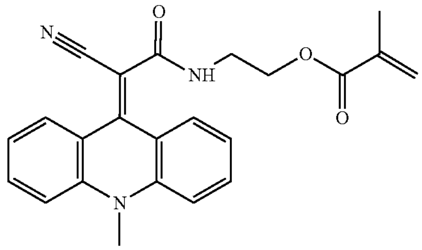 [SMILES: C=C(C)C(=O)OCCNC(=O)C(C#N)=C1c2ccccc2N(C)c2ccccc21]

2-(2-cyano-2-(10-methylacridin-9(10H)-ylidene)acetamido)ethyl methacrylate

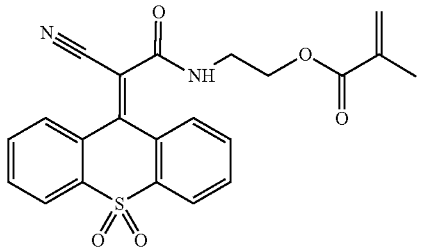 [SMILES: C=C(C)C(=O)OCCNC(=O)C(C#N)=C1c2ccccc2S(=O)(=O)c2ccccc21]

2-(2-cyano-2-(10,10-dioxido-9H-thioxanthen-9-ylidene)acetamido)ethyl methacrylate

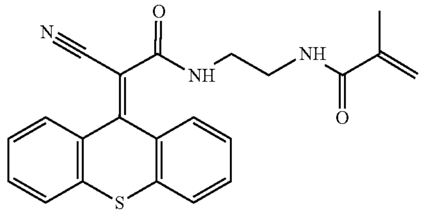 [SMILES: C=C(C)C(=O)NCCNC(=O)C(C#N)=C1c2ccccc2Sc2ccccc21]

N-(2-(2-cyano-2-(9H-thioxanthen-9-ylidene)acetamido)ethyl)methacrylamide

TABLE B-continued
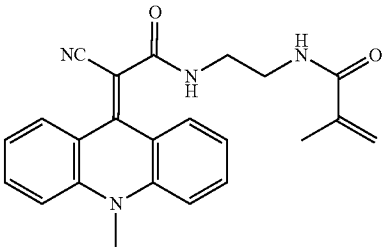 [SMILES: C=C(C)C(=O)NCCNC(=O)C(C#N)=C1c2ccccc2N(C)c2ccccc21]
N-(2-(2-cyano-2-(10-methylacridin-9(10H)ylidene)acetamido)ethyl)-methacrylamide
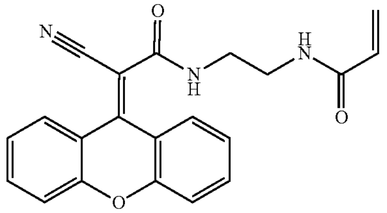 [SMILES: C=CC(=O)NCCNC(=O)C(C#N)=C1c2ccccc2Oc2ccccc21]
N-(2-(2-cyano-2-(9H-xanthen-9-ylidene)acetamido)ethyl)acrylamide
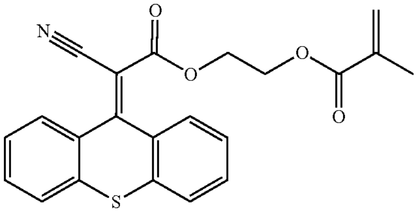 [SMILES: C=C(C)C(=O)OCCOC(=O)C(C#N)=C1c2ccccc2Sc2ccccc21]
2-(2-cyano-2-(9H-thioxanthen-9-ylidene)acetoxy)ethyl methacrylate
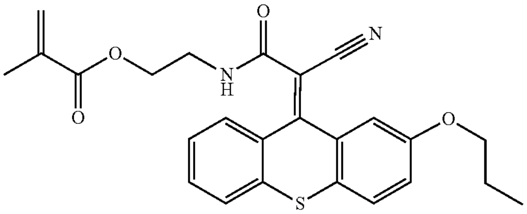 [SMILES: C=C(C)C(=O)OCCNC(=O)/C(C#N)=C1\c2ccccc2Sc2ccc(OCCC)cc21]
(E)-2-(2-cyano-2-(2-propoxy-9H-thioxanthen-9-ylidene)acetamido)ethyl methacrylate
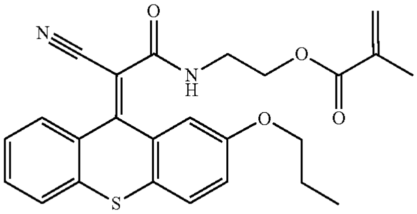 [SMILES: C=C(C)C(=O)OCCNC(=O)/C(C#N)=C1/c2ccccc2Sc2ccc(OCCC)cc21]
(Z)-2-(2-cyano-2-(2-propoxy-9H-thioxanthen-9-ylidene)acetamido)ethyl methacrylate TABLE B-continued
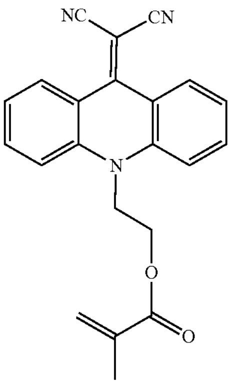 [SMILES: C=C(C)C(=O)OCCN1c2ccccc2C(=C(C#N)C#N)c2ccccc21]
2-(9-(dicyanomethylene)acridin-10(9H)-yl)ethyl methacrylate
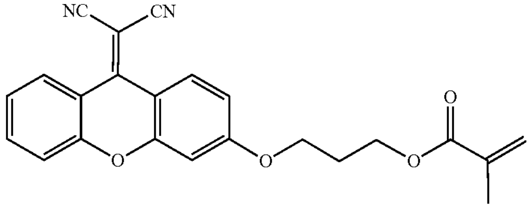 [SMILES: C=C(C)C(=O)OCCCOc1ccc2c(c1)Oc1ccccc1C2=C(C#N)C#N]
3-((9-(dicyanomethylene)-9H-xanthen-3-yl)oxy)propyl methacrylate
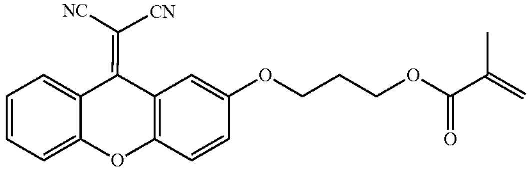 [SMILES: C=C(C)C(=O)OCCCOc1ccc2c(c1)C(=C(C#N)C#N)c1ccccc1O2]
3-((9-(dicyanomethylene)-9H-xanthen-2-yl)oxy)propyl methacrylate
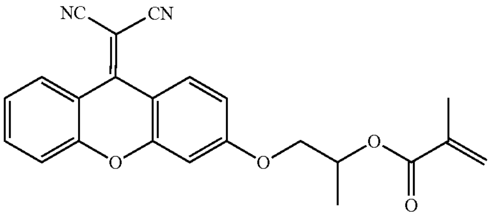 [SMILES: C=C(C)C(=O)OC(C)COc1ccc2c(c1)Oc1ccccc1C2=C(C#N)C#N]
1-((9-(dicyanomethylene)-9H-xanthen-3-yl)oxy)propan-2-yl methacrylate
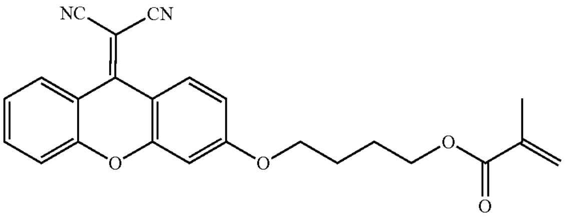 [SMILES: C=C(C)C(=O)OCCCCOc1ccc2c(c1)Oc1ccccc1C2=C(C#N)C#N]
4-((9-(dicyanomethylene)-9H-xanthen-3-yl)oxy)butyl methacrylate
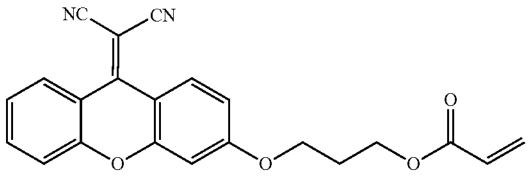 [SMILES: C=CC(=O)OCCCOc1ccc2c(c1)Oc1ccccc1C2=C(C#N)C#N]
3-((9-(dicyanomethylene)-9H-xanthen-3-yl)oxy)propyl acrylate TABLE B-continued

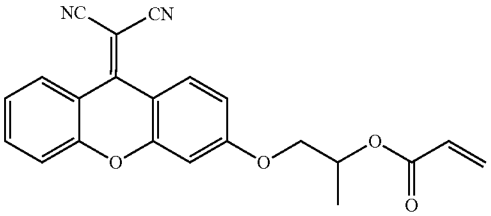 [SMILES: C=CC(=O)OC(C)COc1ccc2c(c1)Oc1ccccc1C2=C(C#N)C#N]

1-((9-(dicyanomethylene)-9H-xanthen-3-yl)oxy)propan-2-yl acrylate

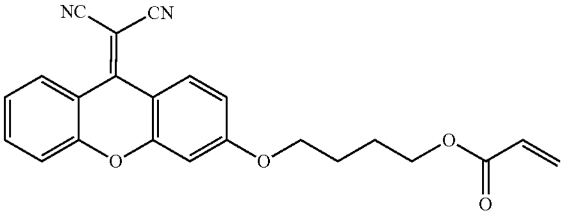 [SMILES: C=CC(=O)OCCCCOc1ccc2c(c1)Oc1ccccc1C2=C(C#N)C#N]

4-((9-(dicyanomethylene)-9H-xanthen-3-yl)oxy)butyl acrylate

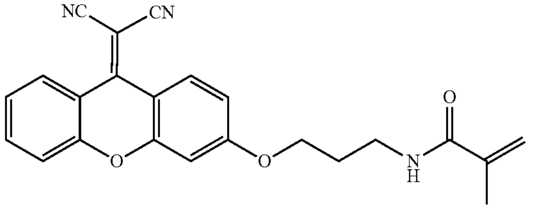 [SMILES: C=C(C)C(=O)NCCCOc1ccc2c(c1)Oc1ccccc1C2=C(C#N)C#N]

N-(3-((9-(dicyanomethylene)-9H-xanthen-3-yl)oxy)propyl)methacrylamide

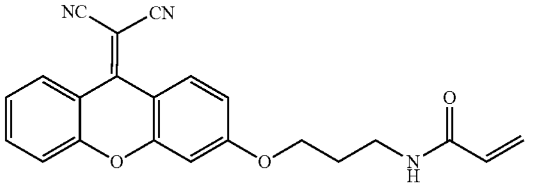 [SMILES: C=CC(=O)NCCCOc1ccc2c(c1)Oc1ccccc1C2=C(C#N)C#N]

N-(3-((9-(dicyanomethylene)-9H-xanthen-3-yl)oxy)propyl)acrylamide

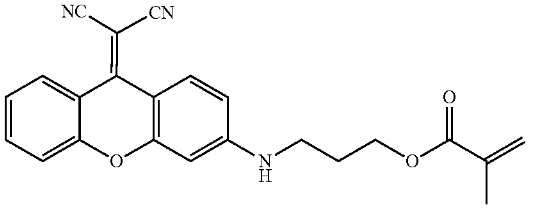 [SMILES: C=C(C)C(=O)OCCCNc1ccc2c(c1)Oc1ccccc1C2=C(C#N)C#N]

3-((9-(dicyanomethylene)-9H-xanthen-3-yl)amino)propyl methacrylate

Compounds of formula I may be used in combination with other light absorbing compounds to provide desirable absorption characteristics. For example, preferred compositions may comprise a compound of formula I and a UV absorbing compound. The UV absorbing compound may, for example, also be a compound of formula I that absorbs in the UV region or it may be another UV absorbing compound. Suitable UV absorbing compounds other than formula I are known in the art, and fall into several classes which include, but are not limited to, benzophenones, benzotriazoles, triazines, substituted acrylonitriles, salicyclic acid derivatives, benzoic acid derivatives, cinnamic acid derivatives, chalcone derivatives, dypnone derivatives, crotonic acid derivatives, or any mixtures thereof. A preferred class of UV absorbing compound is benzotriazoles, such as Norbloc (2-(2'-hydroxy-5-methacrylyloxyethylphenyl)-2H-benzotriazole).

Compounds of formula I may be prepared by those skilled in the art using literature methods. By way of example, various compounds of formula I where the EWG is cyano may be prepared as shown in Scheme 1 and the associated description. Exemplary reagents and procedures for these reactions appear in the working examples.

Scheme 1

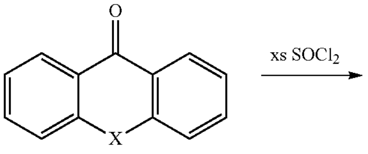

-continued

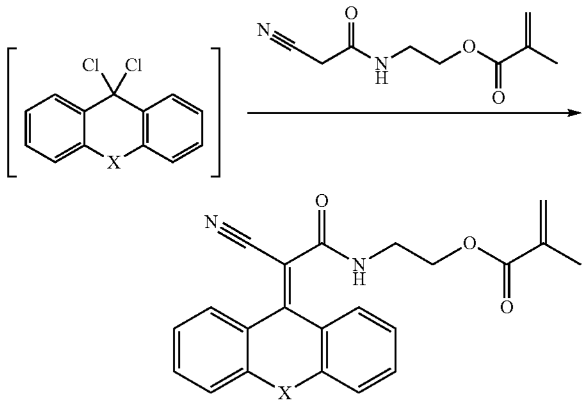

Scheme 1 shows a method for preparing exemplary compounds of the invention. Thus, the carbonyl moiety of the starting material is converted to a reactive dihalide intermediate, which is further reacted with the active methylene compound without further purification or isolation. The reaction mixture is protected from air and moisture until completion of the reaction with the cyanomethyl amide derivative. Other compounds of the invention may be prepared by those skilled in the art using analogous procedures to those shown in Scheme 1 with appropriate substitution of reagents.

Other compounds of formula I may be prepared by those skilled in the art by using or adapting the general strategy shown in Scheme 2.

Scheme 2

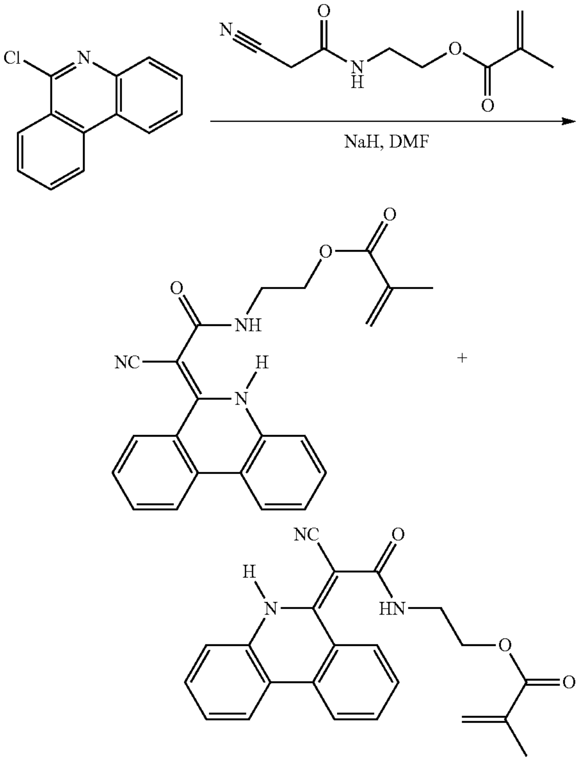

-continued

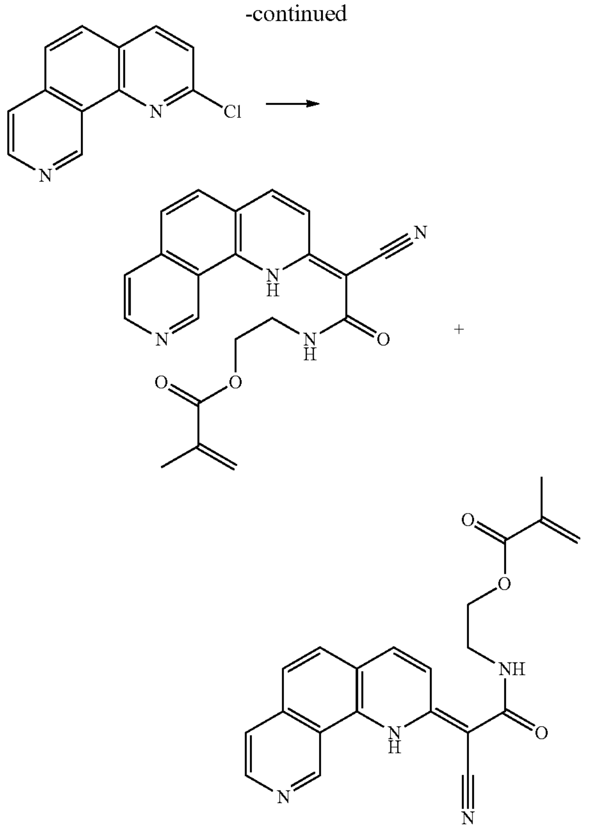

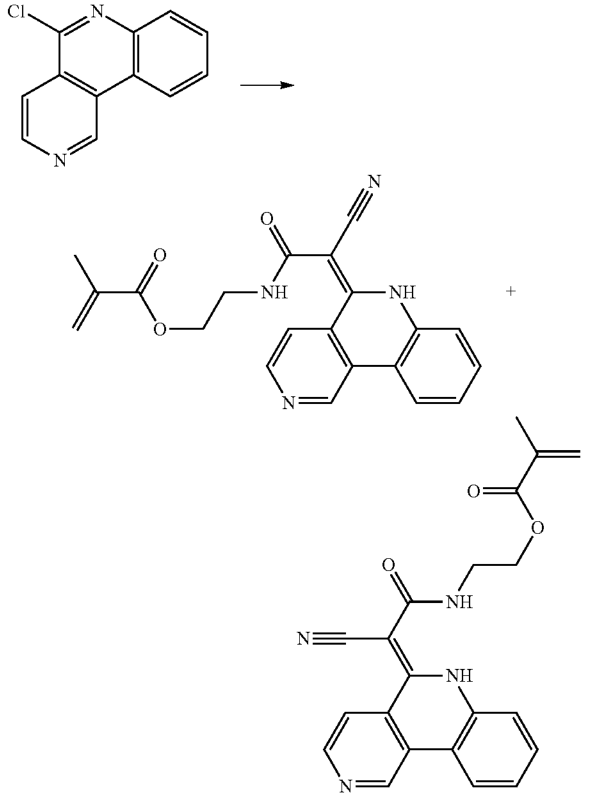

Compounds of formula I may be included in reactive mixtures to form various products, including biomedical devices and ophthalmic devices. Generally, the compounds of formula I may be present in any amount up to the limit of their solubility. For instance, the compounds may be present at concentration of least 0.1 percent or at least 2 percent; and up to 10 percent or up to 5 percent, based on the weight percentages of all components in the reactive mixture, excluding diluent. A typical concentration may be in the range of 1 to 5 percent. The upper limit is typically determined by the solubility of the compound with other co-monomers and or diluents in the reactive monomer mix.

Preferably, the compounds of formula I are included in ophthalmic devices. A variety of ophthalmic devices may be prepared, including hard contact lenses, soft contact lenses, corneal onlays, corneal inlays, intraocular lenses, or overlay lenses. Preferably, the ophthalmic device is an intraocular lens or a soft contact lens. The soft contact lens may be made from a conventional (non-silicone) hydrogel or from a silicone hydrogel.

Ophthalmic devices of the invention may comprise a free radical reaction product of a reactive mixture containing one or more monomers suitable for making the desired ophthalmic device (also referred to herein as device forming monomers or hydrogel forming monomers), and optional components. When polymerized, the reactive mixture results in formation of a polymeric network of which the ophthalmic device may be comprised. The polymeric network may, for instance, be a hydrogel (e.g., a conventional hydrogel or a silicone hydrogel).

A compound of formula I may be copolymerized with the other components in the reactive mixture, in which case the reactive mixture may, in addition to one or more monomers suitable for making the desired ophthalmic device (and any optional components), also contain one or more compounds of formula I.

Alternatively or in addition, the compound of formula I may be incorporated in the polymeric network as a pre-formed non-reactive polymer. The non-reactive polymer may be included in the reactive mixture or it may be incorporated in the polymeric network after the polymeric network has already been formed from the reactive mixture (for instance, as a coating, or by heating a mixture of the polymeric network with the non-reactive polymer).

The non-reactive polymer may comprise repeating units derived from a compound of formula I. The non-reactive polymer may comprise, in addition to repeating units derived from a compound of formula I, repeating units derived from other compounds, such as an amide monomer or a monofunctional polyalkylene glycol, or a combination thereof. The non-reactive polymer may contain at least 0.1 mole percent, alternatively at least 1 mole percent, alternatively at least 10 mole percent, or alternatively at least 20 mole percent of repeating units derived from compounds of formula I. The non-reactive polymer may contain 100 mole percent, alternatively up to 80 mole percent, alternatively up to 50 mole percent, alternatively up to 20 mole percent, or alternatively up to 5 mole percent of repeating units derived from compounds of formula I.

An exemplary monofunctional polyalkylene glycol that may be used for forming the non-reactive polymer is a monofunctional polyethylene glycol having a weight average molecular weight from about 200 to about 10,000 g/mole, such as from about 200 to about 2,000 g/mole. The monofunctional polyethylene glycol comprises only one polymerizable group and may be a mono-ether terminated, mono-(meth)acrylate or (meth)acrylamide terminated polyethylene glycol. Examples of mono-ether terminal groups include, but are not limited to, $C_1$-$C_6$ alkoxy groups, such as methoxy and ethoxy or alkoxy groups comprising up to 8 carbons. Examples of such mono-ether terminated, mono-methacrylate terminated polyethylene glycol include, but are not limited to, mPEG 475 (polyethyleneglycol (475 Mw) monomethylether monomethacrylate), available from Sigma-Aldrich, St. Louis, MO USA ("mPEG475").

Examples of amide monomers that may be used for forming the non-reactive polymer include an acyclic amide of formula H1 or H2, a cyclic amide of formula H3, or combinations thereof:

H1

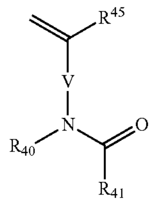

H2

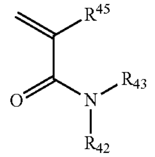

H3

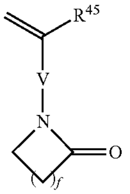

wherein $R^{45}$ is H or methyl; V is a direct bond, —(CO)—, or —($CONHR_{44}$)—; $R_{44}$ is $C_1$ to $C_3$ alkyl; $R_{40}$ is H or $C_1$ to $C_4$ alkyl; $R_{41}$ is H, $C_1$ to $C_4$ alkyl, amino having up to two carbon atoms, amide having up to four carbon atoms, and alkoxy having up to two carbon groups; $R_{42}$ is H, $C_1$ to $C_4$ alkyl groups; or methoxy, ethoxy, hydroxyethyl, or hydroxymethyl; $R_{43}$ is H, $C_1$ to $C_4$ alkyl; or methoxy, ethoxy, hydroxyethyl, or hydroxymethyl; wherein the number of carbon atoms in $R_{40}$ and $R_{41}$ taken together is 8 or less; and wherein the number of carbon atoms in $R_{42}$ and $R_{43}$ taken together is 8 or less; and f is a number from 1 to 10. Exemplary optional substituents on the foregoing groups include amine, amide, ether, hydroxyl, carbonyl or carboxy groups or combinations thereof.

Non-limiting examples of polymeric networks in which the compound of formula I may be incorporated (for instance, as a monomer or non-reactive polymer in the reactive mixture or by subsequent addition) are described above and include, for instance, etafilcon, genfilcon, hilafilcon, lenefilcon, nesofilcon, omafilcon, polymacon, vifilcon, acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants.

By way of further example, a polymeric network may be made from a reactive mixture comprising one or more of: hydrophilic components, hydrophobic components, silicone-containing components, wetting agents such as polyamides, crosslinking agents, and further components such as diluents and initiators. As discussed above, the reactive mixture may also contain one or more compounds of formula I, and/or a non-reactive polymer comprising repeating units derived from one or more compounds of formula I, or the non-reactive polymer may be added after formation of the polymeric network.

Hydrophilic Components

Examples of suitable families of hydrophilic monomers that may be present in the reactive mixture include (meth) acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth) acrylamide, N-(3-hydroxybutyl) (meth)acrylamide, N-(4-hydroxybutyl) (meth)acrylamide, 2-aminoethyl (meth) acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth) acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-O-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido methylpropane sulfonic acid (AMPS), 1-propanaminium, N-(2-carboxyethyl)-N,N-dimethyl [(1-oxo-2-propen-1-yl) amino]-, inner salt (CBT), 1-propanaminium, N,N-dimethyl-N-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl)dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-Containing Components

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise: one or more polymerizable groups that are independently a (meth)acrylate, a styryl, a vinyl ether, a (meth)acrylamide, an N-vinyl lactam, an N-vinylamide, an 0-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth) acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth) acrylate, a (meth)acrylamide, or mixtures of the foregoing; one or more optionally repeating siloxane units; and one or more linking groups connecting the polymerizable groups to the siloxane units.

The silicone-containing component may comprise one or more polymerizable compounds of Formula A:

Formula A

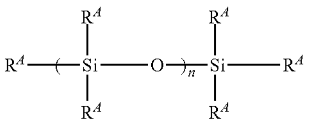

wherein:

at least one $R^A$ is a group of formula $R_g$-L- wherein $R_g$ is a polymerizable group and L is a linking group, and the remaining $R^A$ are each independently:

(a) $R_g$-L-, (b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof, (c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof, (d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof, (e) halo, (f) alkoxy, cyclic alkoxy, or aryloxy, (g) siloxy, (h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or (i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table C. Where the compounds in Table C contain polysiloxane groups, the number of SiO repeat units in such compounds, unless otherwise indicated, is preferably from 3 to 100, more preferably from 3 to 40, or still more preferably from 3 to 20.

TABLE C

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SiMAA) |
| 16 | 2-hydroxy-3-methacryloxypropyloxypropyl-tris(trimethylsiloxy)silane |
| 17 | 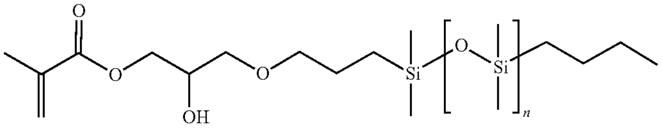 mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units) |

TABLE C-continued
18
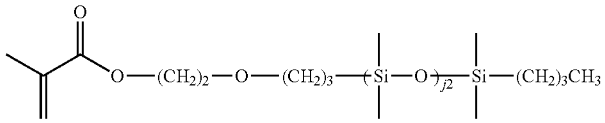
19
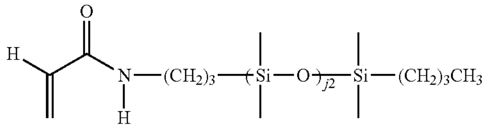
20
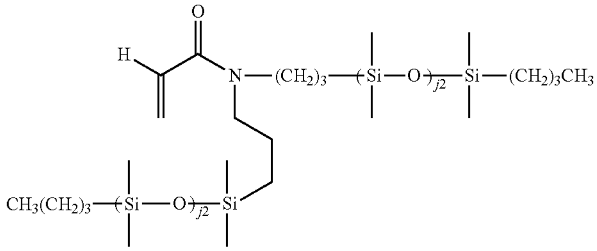
21
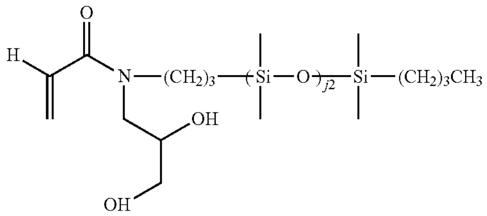
22
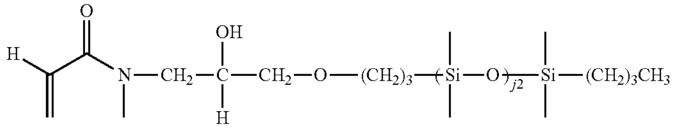
23
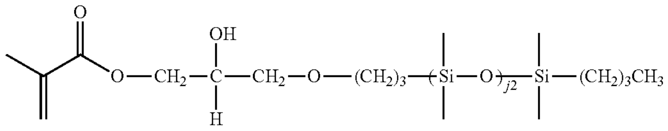
24
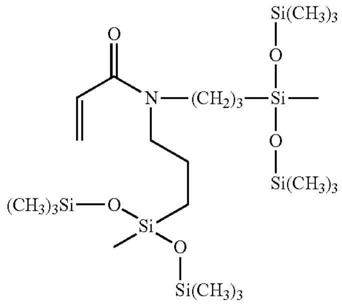

Additional non-limiting examples of suitable silicone-containing components are listed in Table D. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE D

| | |
|---|---|
| 25 | 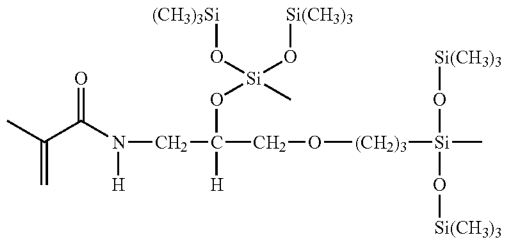 |
| 26 | 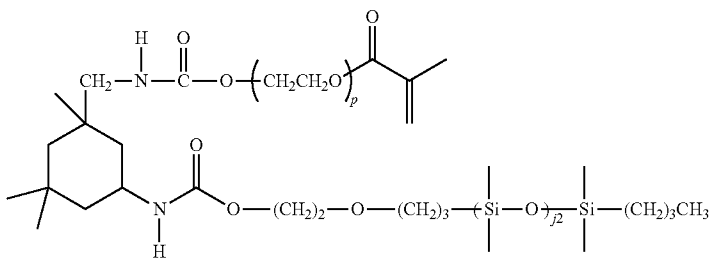<br>p is 1 to 10 |
| 27 | 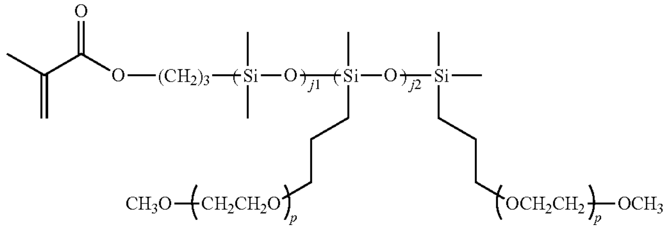<br>p is 5-10 |
| 28 | 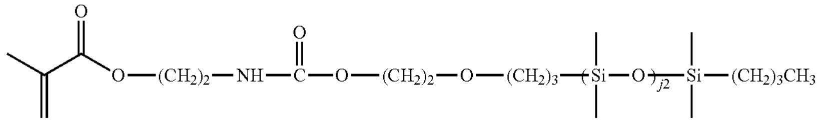 |
| 29 | 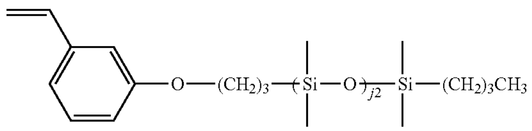 |
| 30 | 1,3-bis[4-(vinyloxycarbonyloxy)but-1-yl]tetramethyl-disiloxane |
| 31 | 3-(vinyloxycarbonylthio) propyl-[tris (trimethylsiloxy)silane] |
| 32 | 3-[tris(trimethylsiloxy)silyl] propyl allyl carbamate |
| 33 | 3-[tris(trimethylsiloxy)silyl] propyl vinyl carbamate |
| 34 | tris(trimethylsiloxy)silylstyrene (Styryl-TRIS) |

TABLE D-continued

35
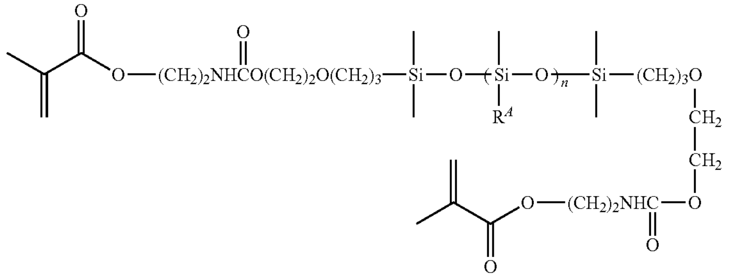

$R^A = CH_3$ (a) or $CH_2CH_2CF_3$ (b) or $CH_2$-$(CH_2)_2$-$[OCH_2CH_2]_{1\text{-}10}$-$OCH_3$ (c); a + b + c = n 36
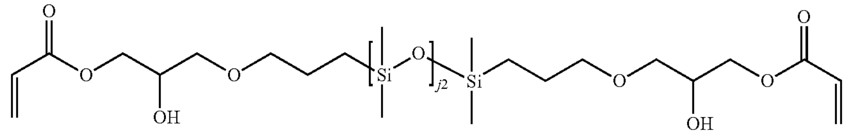

37
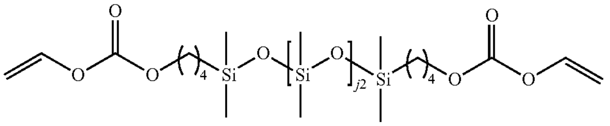

38
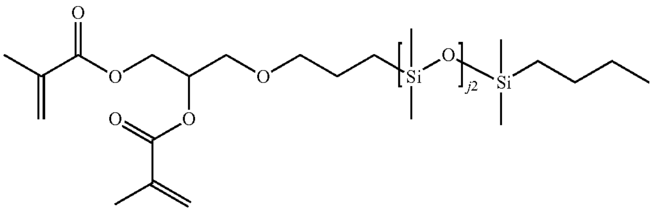

39
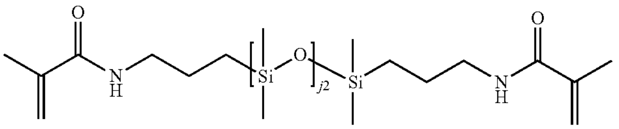

40
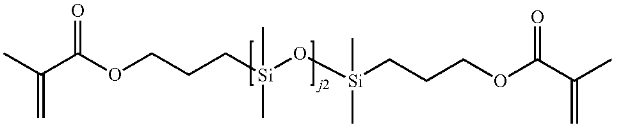

41
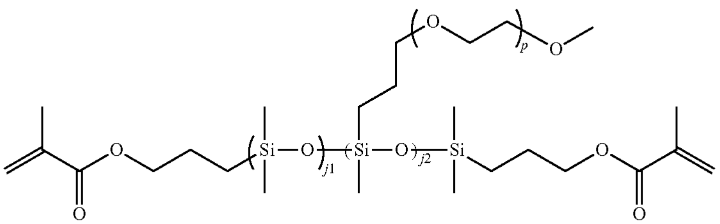

j1 = 80-90
j2 = 5-6
p = 7-8

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]- propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

Formula G1

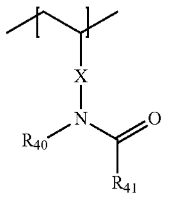

Formula G2

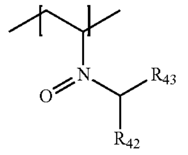

wherein X is a direct bond, —(CO)—, or —(CONHR$_{44}$)—, wherein R$_{44}$ is a $C_1$ to $C_3$ alkyl group; R$_{40}$ is selected from H, straight or branched, substituted or unsubstituted $C_1$ to $C_4$ alkyl groups; R$_{41}$ is selected from H, straight or branched, substituted or unsubstituted $C_1$ to $C_4$ alkyl groups, amino groups having up to two carbon atoms, amide groups having up to four carbon atoms, and alkoxy groups having up to two carbon groups; R$_{42}$ is selected from H, straight or branched, substituted or unsubstituted $C_1$ to $C_4$ alkyl groups; or methyl, ethoxy, hydroxyethyl, and hydroxymethyl; R$_{43}$ is selected from H, straight or branched, substituted or unsubstituted $C_1$ to $C_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in R$_{42}$ and R$_{43}$ taken together may be 6 or less. As used herein substituted alkyl groups include alkyl groups substituted with an amine, amide, ether, hydroxyl, carbonyl or carboxy groups or combinations thereof.

R$_{40}$ and R$_{41}$ may be independently selected from H, substituted or unsubstituted $C_1$ to $C_2$ alkyl groups. X may be a direct bond, and R$_{40}$ and R$_{41}$ may be independently selected from H, substituted or unsubstituted $C_1$ to $C_2$ alkyl groups. R$_{42}$ and R$_{43}$ can be independently selected from H, substituted or unsubstituted $C_1$ to $C_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N, N'-dimethylurea, N, N-dimethylacrylamide, methacrylamide, and acyclic amides of Formulae G2 and G3:

Formula G2

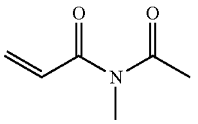

Formula G3

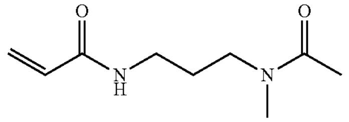

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

Formula G4

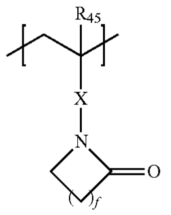

wherein R$_{45}$ is a hydrogen atom or methyl group; wherein f is a number from 1 to 10; wherein X is a direct bond, —(CO)—, or —(CONHR$_{46}$)—, wherein R$_{46}$ is a $C_1$ to $C_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth) acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-O-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a Mw of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons; greater than about 150,000; between about 150,000 to about 2,000,000 daltons; between about 300,000 to about 1,800,000 daltons. Higher molecular weight polyamides may be used if they are compatible with the reactive monomer mixture.

Cross-Linking Agents

It is generally desirable to add one or more cross-linking agents, also referred to as cross-linking monomers, multi-functional macromers, and prepolymers, to the reactive mixture. The cross-linking agents may be selected from bifunctional crosslinkers, trifunctional crosslinkers, tetra-functional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end-capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes a, w-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described in Table D above.

Further Constituents

The reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, nonpolymerizable dyes, release agents, and combinations thereof.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylbenzyldiphenyl phosphine oxide and 2,4,6-trimethylbenzoyl diphenylphosphine oxide, benzoin methyl ester and a combination of cam- phorquinone and ethyl 4-(N,N-dimethylamino)benzoate.

Commercially available (from IGM Resins B.V., The Netherlands) visible light initiator systems include Irgacure® 819, Irgacure® 1700, Irgacure® 1800, Irgacure® 819, Irgacure® 1850 and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO).

The reactive mixture for making the ophthalmic devices of the invention may comprise, in addition to a compound of formula I, any of the polymerizable compounds and optional components described above.

The reactive mixture may comprise: a compound of formula I, and a hydrophilic component.

The reactive mixture may comprise: a compound of formula I, and a hydrophilic component selected from DMA, NVP, HEMA, VMA, NVA, methacrylic acid, and mixtures thereof. Preferred are mixtures of HEMA and methacrylic acid.

The reactive mixture may comprise: a compound of formula I, a hydrophilic component, and a silicone-containing component.

The reactive mixture may comprise: a compound of formula I, a hydrophilic component selected from DMA, HEMA and mixtures thereof; a silicone-containing component selected from 2-hydroxy-3-[3-methyl-3,3-di(trimethylsiloxy)silylpropoxy]-propyl methacrylate (SiMAA), mono-methacryloxypropyl terminated mono-n-butyl terminated polydimethylsiloxane (mPDMS), mono-(2-hydroxy-3-methacryloxypropyl)-propyl ether terminated mono-n-butyl terminated polydimethylsiloxane (OH-mPDMS), and mixtures thereof; and a wetting agent (preferably PVP or PVMA). For the hydrophilic component, mixtures of DMA and HEMA are preferred. For the silicone containing component, mixtures of SiMAA and mPDMS are preferred.

The reactive mixture may comprise: a compound of formula I, a hydrophilic component comprising a mixture of DMA and HEMA; a silicone-containing component comprising a mixture of OH-mPDMS having from 2 to 20 repeat units (preferably a mixture of 4 and 15 repeat units). Preferably, the reactive mixture further comprises a silicone-containing crosslinker, such as ac-PDMS. Also preferably, the reactive mixture contains a wetting agent (preferably DMA, PVP, PVMA or mixtures thereof).

The reactive mixture may comprise: a compound of formula I; between about 1 and about 15 wt % at least one polyamide (e.g., an acyclic polyamide, a cyclic polyamide, or mixtures thereof); at least one first mono-functional, hydroxyl substituted poly(disubstituted siloxane) having 4 to 8 siloxane repeating units (e.g., OH-mPDMS where n is 4 to 8, preferably n is 4); at least one second hydroxyl substituted poly(disubstituted siloxane) that is a mono-functional hydroxyl substituted poly(disubstituted siloxane)s having 10 to 200 or 10-100 or 10-50 or 10-20 siloxane repeating units (e.g., OH-mPDMS where n is 10 to 200 or 10-100 or 10-50 or 10-20, preferably n is 15); about 5 to about 35 wt % of at least one hydrophilic monomer; and optionally a multifunctional hydroxyl substituted poly(disubstituted siloxane)s having 10 to 200, or 10 to 100 siloxane repeating units (e.g., ac-PDMS). Preferably, the first mono-functional, hydroxyl substituted poly(disubstituted siloxane) and the second hydroxyl substituted poly(disubstituted siloxane) are present in concentrations to provide a ratio of weight percent of the first mono-functional, hydroxyl substituted poly(disubstituted siloxane) to weight percent of the second hydroxyl substituted poly(disubstituted siloxane) of 0.4-1.3, or 0.4-1.0.

The foregoing reactive mixtures may contain optional ingredients such as, but not limited to, one or more initiators, internal wetting agents, crosslinkers, other UV or HEV absorbers, and diluents.

If the monomer suitable for making the ophthalmic device as described above is a combination of a hydrophilic component and a silicone containing component, then the reaction product preferably comprises repeating units derived from a compound of formula I other than a compound of formula I-z:

formula I-z

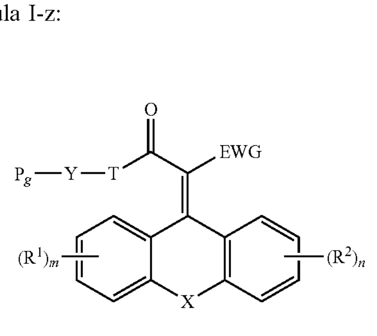

It should be noted that a compound of formula I-z may still be present in the reaction product, but it is preferable that other compounds of formula I may also be present.

Curing of Hydrogels and Manufacture of Lens

The reactive mixtures may be formed by any of the methods known in the art, such as shaking or stirring, and used to form polymeric articles or devices by known methods. The reactive components are mixed together either with or without a diluent to form the reactive mixture.

For example, ophthalmic devices may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded ophthalmic device, such as a silicone hydrogel contact lens, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens.

The reactive mixture may be cured via any known process for molding the reactive mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the silicone hydrogels, which is economical, and enables precise control over the final shape of the hydrated lens. For this method, the reactive mixture is placed in a mold having the shape of the final desired silicone hydrogel and the reactive mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

As indicated above, preferred ophthalmic devices are contact lenses, more preferably soft hydrogel contact lenses. The transmission wavelengths and percentages described herein may be measured on various thicknesses of lenses using, for instance, the methodologies described in the Examples. By way of example, a preferred center thickness for measuring transmission spectra in a soft contact lens may be from 80 to 100 microns, or from 90 to 100 microns or from 90 to 95 microns. Typically, the measurement may be made at the center of the lens using, for instance, a 4 nm instrument slit width. Various concentrations of the one or more polymerizable high energy light absorbing compounds may be used to achieve the transmission characteristics described above. For instance, the concentration may be in the range of at least 1 percent, or at least 2 percent; and up to 10 percent, or up to 5 percent, based on the weight percentages of all components in the reactive mixture, excluding diluent. A typical concentration may be in the range of 3 to 5 percent.

Silicone hydrogel ophthalmic devices (e.g., contact lenses) according to the invention preferably exhibit the following properties. All values are prefaced by "about," and the devices may have any combination of the listed properties. The properties may be determined by methods known to those skilled in the art, for instance as described in United States pre-grant publication US20180037690, which is incorporated herein by reference.

- Water concentration %: at least 20%, or at least 25% and up to 80% or up to 70%
- Haze: 30% or less, or 10% or less
- Advancing dynamic contact angle (Wilhelmy plate method): 100° or less, or 80° or less; or 50° or less
- Tensile Modulus (psi): 120 or less, or 80 to 120
- Oxygen permeability (Dk, barrers): at least 80, or at least 100, or at least 150, or at least 200
- Elongation to Break: at least 100

For ionic silicon hydrogels, the following properties may also be preferred (in addition to those recited above):

- Lysozyme uptake (μg/lens): at least 100, or at least 150, or at least 500, or at least 700
- Polyquaternium 1 (PQ1) uptake (%): 15 or less, or 10 or less, or 5 or less Some embodiments of the invention will now be described in detail in the following Examples.

EXAMPLES

Test Methods

Ultraviolet-Visible Spectroscopy Test Method: Ultraviolet-visible spectra of compounds in solution were measured on a Perkin Elmer Lambda 45, an Agilent Cary 6000i, or an Ocean Optics QE65 PRO (DH-2000-BAL Light Source) UV/VIS scanning spectrometer. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission or absorbance; and baseline correction was selected. For the Cary instrument, the scan range was 200-800 nm; the scan speed was 600 nm/min; the slit width was 2 nm; the mode was transmission or absorbance; and baseline correction was selected. For the Ocean Optics instrument, the scan range was 200-800 nm; the slit width was 10 μm; the mode was transmission or absorbance; and baseline correction was selected. A baseline correction was performed before samples were analyzed using the autozero function.

Ultraviolet-visible spectra of contact lenses formed in part from the claimed compositions were measured on a Perkin Elmer Lambda 45 UV/VIS, an Agilent Cary 6000i, or an Ocean Optics UV/VIS scanning spectrometer using packing solution. The instrument was thermally equilibrated for at least thirty minutes prior to use. Baseline correction was performed using cuvettes containing plastic two-piece lens holders and the same solvents. These two-piece contact lens holders were designed to hold the sample in the quartz cuvette in the location through which the incident light beam traverses. The reference cuvette also contained a two-piece holder. To ensure that the thickness of the samples is constant, all lenses were made using identical molds. The center thickness of the contact lens was measured using an electronic thickness gauge. Reported center thickness and percent transmission spectra are obtained by averaging three individual lens data.

It is important to ensure that the outside surfaces of the cuvette are completely clean and dry and that no air bubbles are present in the cuvette. Repeatability of the measurement is improved when the reference cuvette and its lens holder remain constant and when all samples use the same sample cuvette and its lens holder, making sure that both cuvettes are properly inserted into the instrument.

The following abbreviations will be used throughout the Examples and have the following meanings:

- LED: light emitting diode
- UV-VIS: ultraviolet-visible
- UV-HEV or UV/HEV: ultraviolet and/or high energy visible
- NMR: nuclear magnetic resonance (spectroscopy)
- TLC: thin layer chromatography
- h: hour(s)
- mm: millimeter(s)
- cm: centimeter(s)
- μm: micrometer(s)
- nm: nanometer(s)
- mL: milleliter(s)
- N: normal (equivalents/liter)
- M: molar (moles/liter)
- mM: millimolar (millimoles/liter)
- microliter(s)
- mW: milliwatt(s)
- g/mol: grams/mole
- DMA: N, N-dimethylacrylamide (Jarchem)
- HEMA: 2-hydroxyethyl methacrylate (Bimax)
- TEGDMA: tetraethylene glycol dimethacrylate (Esstech)
- PVP K90: poly(N-vinylpyrrolidone) [CAS 9003-39-8] (Ashland)
- Omnirad 403: bis(2,6-dimethoxybenzoyl)-2,4,4-trimethylpentylphosphine oxide (IGM Resins)
- Omnirad 819: bis(2,4,6-trimethylbenzoyl)-phenylphosphineoxide (IGM Resins)
- Omnirad 1173: 2-hydroxy-2-methyl-1-phenylpropanone (IGM Resins)
- Omnirad 1700: mixture of 25 weight % Omnirad 403 and 75 weight % Omnirad 1173 (IGM Resins)

Omnirad 1870: mixture of 70 weight % Omnirad 403 and 30 weight % Omnirad 1173 (IGM Resins)

mPDMS: mono-n-butyl terminated monomethacryloxypropyl terminated polydimethylsiloxane (Mn=500-1500 Daltons) (Gelest)

SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate Norbloc: 2-(2"-hydroxy-5-methacrylyloxyethylphenyl)-2H-benzotriazole (Janssen)

RB247: 1,4-Bis[2-methacryloxyethylamino]-9,10-anthraquinone

Compound G: 3-((9-(dicyanomethylene)-9H-xanthen-3-yl)oxy)propyl methacrylate

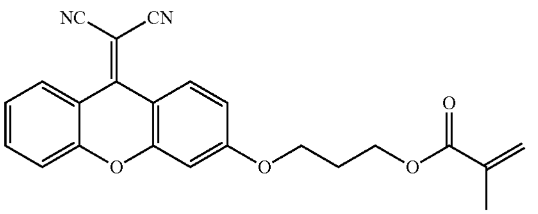 [SMILES: C=C(C)C(=O)OCCCOc1ccc2c(c1)Oc1ccccc1C2=C(C#N)C#N]

D30: 3,7-dimethyl-3-octanol (Vigon)

DIW: deionized water

IPA: isopropyl alcohol

PS: Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.

BC: base curve plastic mold made of PP, TT, Z, or blends thereof

FC: front curve plastic mold made of PP, TT, Z, or blends thereof

PP: polypropylene which is the homopolymer of propylene

TT: Tuftec which is a hydrogenated styrene butadiene block copolymer (Asahi Kasei Chemicals)

Z: Zeonor which is a polycycloolefin thermoplastic polymer (Nippon Zeon Co Ltd)

Preparation 1—Synthesis of 2-(2-Cyanoacetamido)Ethyl Methacrylate

Methyl cyanoacetate (40 grams, 0.4037 mole) and 25 mL of dichloromethane were stirred in a 3 neck, 500 mL round bottom flask under equipped with a reflux condenser under a nitrogen environment. 2-aminoethanol (23.8 grams, 0.3897 mole, —0.97 eq.) was added to the solution via an addition funnel, after which the temperature rose and the methylene chloride began to reflux. After the exotherm ceased, external heat was applied to continue a gentle reflux for a total of two hours, after which no ethanolamine was observed by thin layer chromatography.

The reaction may also be conducted at room temperature and is complete within a few hours. The mixture was cooled to room temperature and all the methylene chloride was evaporated at reduced pressure. The residual oil was washed three times with 50 mL of ethyl acetate to remove unreacted starting material and non-polar impurities. The residual ethyl acetate was then removed under reduced pressure, and the resulting oil was used for acylation without any further purification.

The crude N-2-hydroxyethylacetamide derivative was dissolved in 150 mL of dichloromethane containing 40 grams of pyridine (~0.5 mole) in a three-neck round bottom flask equipped with a reflux condenser, an addition funnel, and a magnetic stirring bar. The flask was immersed in an ice bath and allowed to cool down to around 0° C. Methacryloyl chloride (45.76 grams, ~0.44 mole) was added dropwise from the addition funnel, and the resulting reaction mixture was allowed to warm up to room temperature while constantly stirring the system. Methanol (20 mL) was the added to the flask to quench any unreacted methacryloyl chloride. The volatile components were removed by rotary evaporation under reduced pressure, and the crude product dissolved in 800 mL of dilute aqueous HCl. The resulting aqueous solution was extracted three times with 100 mL of hexanes in a separatory funnel to remove any non-polar impurities. The organic layers were discarded. Sodium chloride was added to the aqueous layer which was then extracted three times with 300 mL of ethyl acetate. About 50 milligrams of BHT were added to the combined organic fractions as an inhibitor, and the ethyl acetate removed by rotary evaporation under reduced pressure. The crude product crystallized out of solution during solvent removal. When about 100 mL of ethyl acetate was left in the flask, 250 mL of hexanes was added, and the crude product was isolated by vacuum filtration using a fritted glass funnel. Thin layer chromatography indicated the presence of a single compound. The filter cake was washed two times with 150 mL of hexanes and then vacuum dried at 40° C., yielding 53 grams (about 70% yield) of 2-(2-cyanoacetamido)ethyl methacrylate. $^{1}H$ NMR (500 MHz, $CDCl_3$) δ 1.93 (3H, s, $CH_3$), 3.36 (2H, s, $CNCH_2$), 3.60 (2H, dd, $CH_2NH$), 4.26 (2H, t, $CH_2OC{=}O$), 5.59 (1H, m, vinylic), 6.11 (1H, bs, vinylic), 6.52 (1H, bs, NH).

Example 1—Synthesis of a Mixture Isomers of (E and Z)-2-(2-cyano-2-(9H-thieno[3,2-b]thiochromen-9-ylidene)acetamido)ethyl methacrylate, and (E and Z)-2-cyano-N-(2-((3-methylbuta-1,3-dien-2-yl)oxy)ethyl)-2-(4H-thieno[2,3-b]thiochromen-4-ylidene)acetamide (Compound A) as shown in Scheme 1

Scheme 1

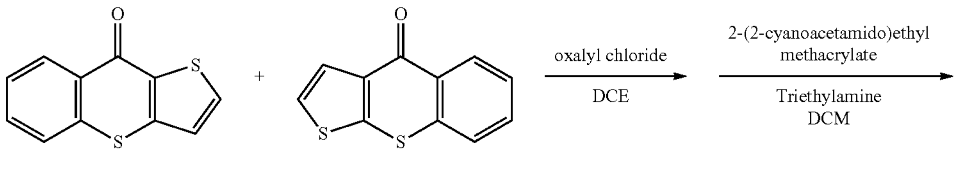

-continued

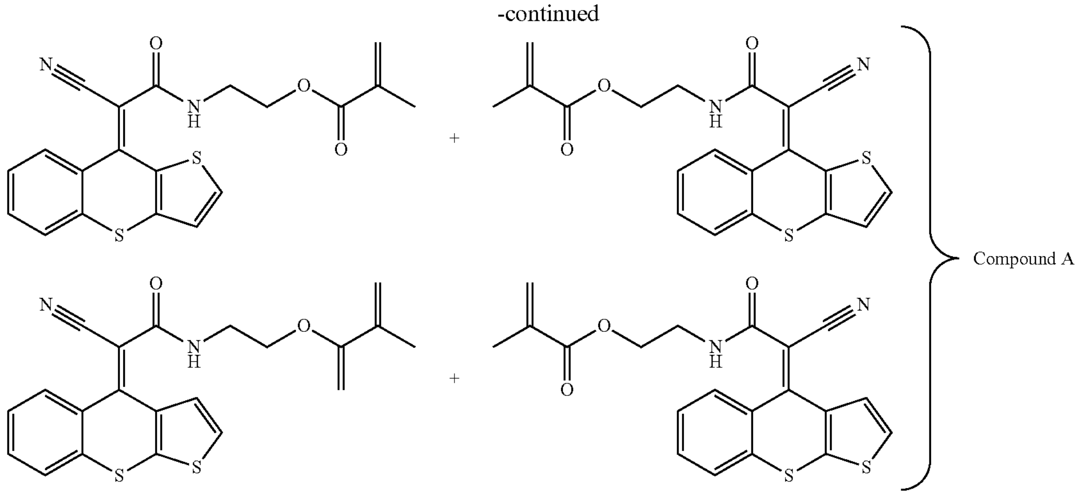

To a stirred suspension of 7.0 grams of 9H-thieno[3,2-b]thiochromen-9-one and 4H-thieno[2,3-b]thiochromen-4-one (0.032 mole) in 40 mL of anhydrous 1,2-dichloroethane under a nitrogen atmosphere, oxalyl chloride (25 grams, ~3 eq.) was added in a dropwise fashion over five minutes. The mixture darkened rapidly and a gradual exotherm was observed. Once the exotherm ceased, the mixture was heated for 6 hours at 55° C. Thereafter, the system cooled down to room temperature, and the volatiles were evaporated under reduced pressure, yielding a solid. Under a nitrogen atmosphere, a solution of 7.0 grams of 2-(2-cyanoacetamido)ethyl methacrylate (~0.036 mole) and 5.0 grams of triethylamine (excess) in 50 mL of anhydrous dichloromethane was added to the solid. The mixture was stirred at room temperature for 20 minutes and then heated to a gentle reflux for 6 hours. The system cooled down to room temperature, and the volatiles were evaporated under reduced pressure. The crude products were dissolved in warm ethyl acetate and filtered. The filtrate was concentrated. The mixture of target molecules were isolated after purification on a silica gel column (mixture denoted as Compound A). Mixture of isomers—Compound A (mixture of isomers)$^1$H NMR ($CDCl_3$) δ 1.85-1.94 (3H, m, $CH_3$), 3.51-3.69 (2H, multiple signals, $CH_2$), 4.10-4.29 (2H, multiple signals, $CH_2$), 5.54-5.58 (1H, multiple signals, vinylic), 6.00-6.12 (1H, multiple signals, vinylic), 6.10-6.49 (1H, multiple signals, NH), 6.89-8.54 (6H, multiple signals, ArH)

The UV-VIS transmission spectrum of a 0.2 mM methanolic solution of Compound A is shown in FIG. 1.

Example 3—Synthesis of a Mixture Isomers of (E)-2-(2-cyano-2-(2-propoxy-9H-thioxanthen-9-ylidene)acetamido)ethyl methacrylate and (Z)-2-(2-cyano-2-(2-propoxy-9H-thioxanthen-9-ylidene)acetamido)ethyl methacrylate (Compound C) as shown in Scheme 3

Scheme 3

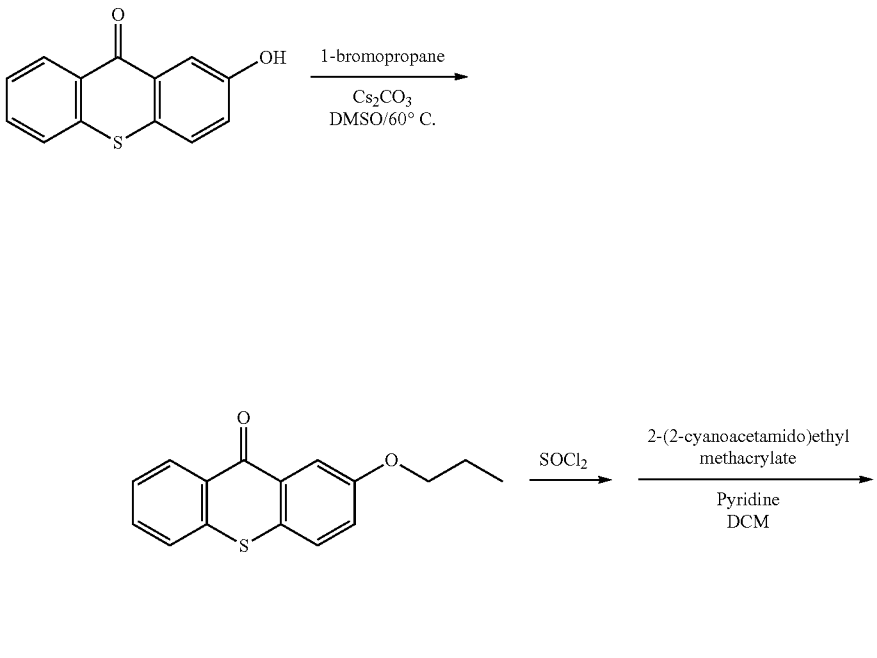

-continued

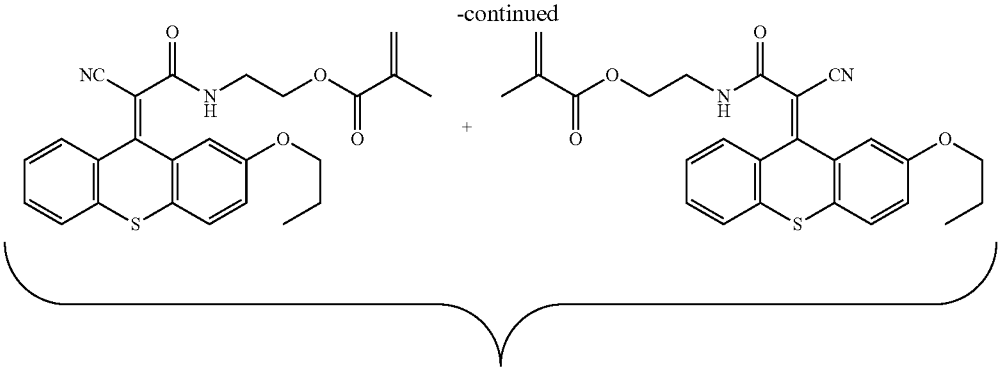

Compound C

To a stirred suspension of 2.28 grams of 2-hydroxy thioxanthenone (0.01 mole) and 5.0 grams of cesium carbonate in anhydrous DMSO under a nitrogen atmosphere, 1.5 grams of 1-bromopropane (~1.25 eq.) were added and the resulting mixture was heated overnight at 60° C. The reaction mixture cooled down and was poured into 300 mL of ethyl acetate. The organics were extracted 3 times with 300 mL of 1% aqueous sodium chloride. The volatiles were removed under reduced pressure and the crude material used "as is" for the next step.

Thionyl chloride (10 grams, 0.085 mole) was added to the crude propyl ether under a nitrogen atmosphere and the mixture was stirred for an hour at reflux. The mixture cooled to room temperature and the volatiles were evaporated under reduced pressure. The system was placed back under a nitrogen atmosphere and a solution of 2-(2-cyano acetamido)ethyl methacrylate (3.0 grams, —1.5 eq.) and 5.0 grams of pyridine (excess) in 30 mL of anhydrous dichloromethane was added. The mixture was stirred at a gentle reflux for an additional 3 hours. The system cooled to room temperature, and the volatiles were evaporated under reduced pressure. The crude products were re-dissolved in ethyl acetate and extracted with dilute aqueous HCl. The organic layer was concentrated, and the product mixture was isolated by chromatography over a silica gel plug (mixture denoted as Compound C). Compound C (mixture of isomers)—$^1H$ NMR ($CDCl_3$) δ0.99 (3H, m, $CH_3$), 1.57-1.85 (2H, m, $CH_2$ and 3H, m, $CH_3$), 3.48 (2H, m, $CH_2$), 3.84 (1H, t, J=6 Hz), 3.98 (1H, t, J=6 Hz), 4.0 (2H, m, $CH_2$), 5.54 (1H, m, vinylic), 5.85 (1H, m, NH), 5.96 and 5.97 (1H, bs (2 signals), NH), 6.78-8.14 (6H, Ar).

The UV-VIS transmission spectrum of a 0.2 mM methanolic solution of Compound C is shown in FIG. 1.

Example 4—Synthesis of 3-(9-(dicyanomethylene) acridin-10(9H)-yl)propyl methacrylate (Compound D) as shown in Scheme 4

Scheme 4

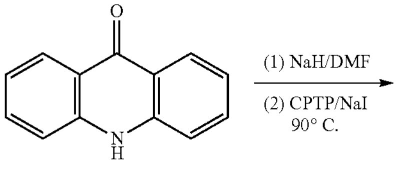

-continued

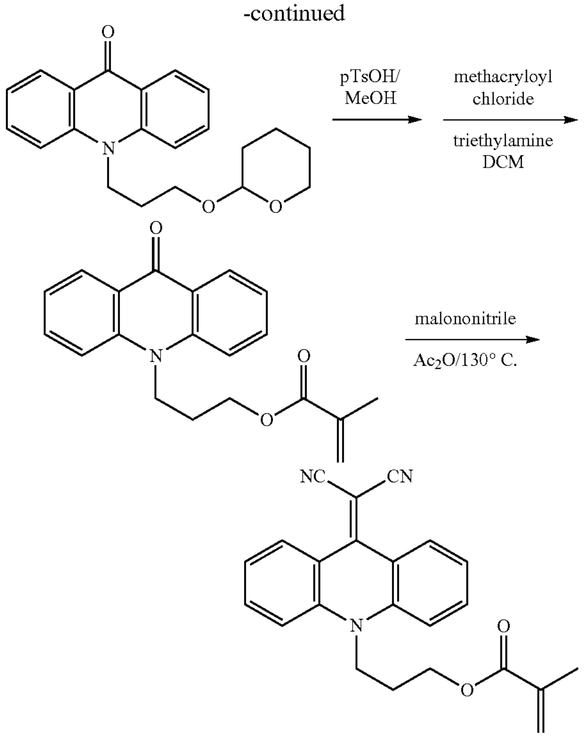

Compound D

Acridone (3.92 grams, 0.02 mole) and 0.8 grams of 60 weight percent suspension of sodium hydride in mineral oil (0.02 mole) were stirred in 20 mL of anhydrous N,N-dimethylformamide under a nitrogen atmosphere. Once the hydrogen gas evolution ceased, 3.9 grams of 2-(3-chloropropoxy)tetrahydro-2H-pyran (~1.1 eq.) were added to the flask, followed by 250 mg of sodium iodide and the mixture was heated in a mantle set-up to 90° C. overnight. The system cooled to room temperature, and the mixture was poured into water and stirred for 15 minutes. The resulting solids were filtered, and the filter cake was washed with dichloromethane to remove most of the unreacted acridone. The filtrate was concentrated under reduced pressure. The residue was dissolved in 200 mL of methanol, 200 mg of p-toluenesulfonic acid was added, and the resulting mixture stirred at room temperature. The deprotection appeared complete by TLC after overnight stirring. The mixture was then stirred at room temperature for 30 minutes after the addition of 2 grams of sodium carbonate. The suspension was filtered, and the volatiles evaporated under reduced pressure. The resulting solids were stirred in 100 mL of cold methanol and filtered. The insoluble material was a mixture of unreacted acridone and the desired product which was nevertheless used directly for the next step.

A mixture of 10-(3-hydroxypropyl)acridin-9(10H)-one and acridin-9(10H)-one (1.6 grams, <6.28 mmole of starting material) and 3 grams of triethylamine (~30 mmole) were stirred in 70 mL of chilled methylene chloride. Methacryloyl chloride (1.0 grams, 9.6 mmole) was added to the mixture in a drop-wise fashion to the system, which was then allowed to warm up to room temperature. Once the acylation appeared complete, the volatile components were removed under reduced pressure and the product was isolated as a 6:1 mixture along with the N-acylated (methacrylamide) acridone derivative after filtration through a short silica gel plug.

Malononitrile (1 gram, 0.015 mole) and 0.5 grams of a mixture of 3-(9-oxoacridin-10(9H)-yl)propyl methacrylate and 10-methacryloylacridin-9(10H)-one (<1.56 mmole) were heated at 130° C. in ~10 mL of acetic anhydride and the reaction was monitored by TLC. The reaction appeared complete after 6 hours as a bright orange non-polar spot was observed as the major product from the reaction. The mixture was cooled to room temperature and then water was added to it with continued stirring for an additional 30 minutes. A precipitate formed and was isolated by filtration and then the filter cake was washed several times with water over a fritted glass funnel. The organics were dissolved in dichloromethane, filtered, and the product was purified after silica gel chromatography using a mixture of ethyl acetate and dichloromethane (Compound D). Compound D $^{1}H$ NMR ($CDCl_3$) δ2.00 (3H, bs, $CH_3$), 2.34 (2H, m, $CH_2$), 4.36 (2H, t, J=6 Hz), 4.45 (2H, m), 5.66 (1H, m, vinylic), 6.17 (1H, m, vinylic), 7.31 (2H, ddd, J=8.5, 7.0, 1.5 Hz, ArH), 7.48 (2H, d, 8.5 Hz, ArH), 7.67 (2H, ddd, J=7.5, 7.0, 1.5 Hz, ArH), 8.51 (2H, dd, J=8.5, 1.5 Hz, ArH).

The UV-VIS transmission spectrum of a 0.2 mM methanolic solution of Compound D is shown in FIG. 1.

Example 5—Synthesis of 2-((9-(dicyanomethylene)-9H-xanthen-3-yl)oxy)ethyl methacrylate (Compound E) as shown in Scheme 5

Scheme 5

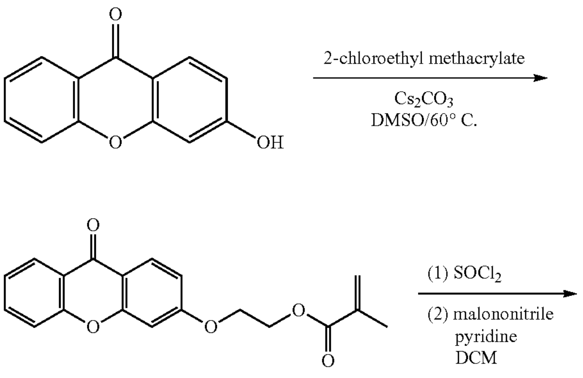

-continued

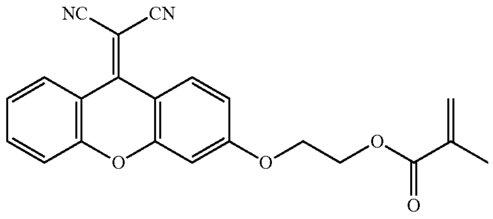

Compound E

A suspension of 3-hydroxy-9H-xanthen-9-one (4.24 grams, 0.02 mole), 7.0 grams $Cs_2CO_3$ (0.07 mole), and 3.0 grams of 2-chloroethyl methacrylate (0.02 mole) in 40 mL of anhydrous DMSO was heated overnight at 60° C. Monitoring by TLC indicated complete consumption of the hydroxyxanthenone along with the formation of a less polar derivative. The reaction mixture was cooled to room temperature and diluted with 500 mL of ethyl acetate. The organics were washed three times with 300 mL of 2 weight percent aqueous sodium chloride, after which they were concentrated under reduced pressure. The resultant solid was washed with hexanes over a fritted glass funnel to yield a white powder of 3-((9-oxo-9H-xanthen-3-yl)oxy)propyl methacrylate.

3-((9-oxo-9H-xanthen-3-yl)oxy)propyl methacrylate (1.0 grams, 3.08 mmole) and 10 grams of thionyl chloride were heated to reflux for four hours under a nitrogen atmosphere. The system was cooled to room temperature and excess thionyl chloride was evaporated under reduced pressure. A solution of 1 gram of malononitrile (~15.15 mmole) in 20 mL of dichloromethane was added to the flask under a nitrogen atmosphere, and the mixture was heated to a gentle reflux for an additional 2 hours. The mixture was cooled to room temperature and the desired product was isolated after purification over a silica gel column (Compound E). The $^{1}H$ NMR spectrum of Compound E is shown in FIG. 8. Compound E $^{1}H$ NMR ($CDCl_3$) δ1.93 (3H, t, J=0.75 Hz, $CH_3$), 4.33 (2H, t, J=4.5 Hz, $CH_2$), 4.53 (2H, m, $CH_2$), 5.59 (1H, m, vinylic), 6.12 (1H, bs, vinylic), 6.90 (1H, d, J=3.0 Hz, ArH), 6.97 (1H, dd, J=9.5, 3.0 Hz, ArH), 7.37 (1H, ddd, J=8.5, 7.0, 1.5 Hz, ArH), 7.42 (1H, dd, J=8.5, 1.5 Hz), 7.65 (1H, ddd, J=8.5, 7.0, 1.5 Hz, ArH), 8.47 (1H, d, J=9.5 Hz, ArH), 8.53 (1H, dd, J=8.5, 1.5 Hz, ArH).

The UV-VIS transmission spectrum of a 0.2 mM methanolic solution of Compound E is shown in FIG. 1 and in FIG. 2.

Example 6-Synthesis of 2-(2-cyano-2-(9H-thioxanthen-9-ylidene)acetamido)ethyl methacrylate (Compound F) as shown in Scheme 6

Scheme 6

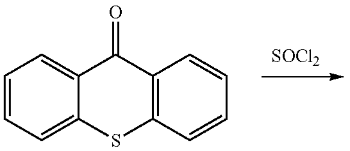

-continued

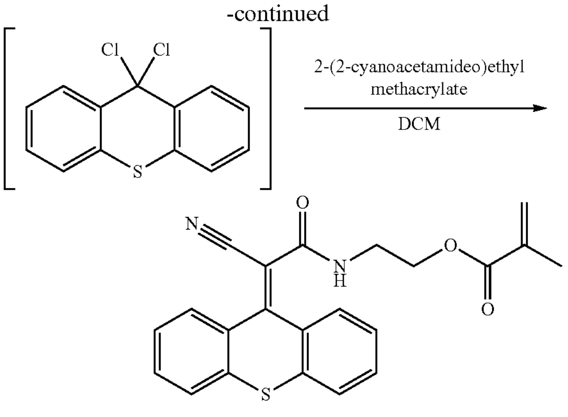

Compound F

A mixture of 9H-thioxanthene-9-one (2.12 grams, 0.01 mole) and thionyl chloride (5 mL, 8.2 grams, ~0.07 mole) was refluxed in a 50 mL round bottom flask under a nitrogen atmosphere with constant stirring. After two hours, the red solution was evaporated to dryness ensuring that all unreacted thionyl chloride was removed from the system. 2-(2-Cyanoacetamido)ethyl methacrylate (A) (2.3 grams, 0.0117 mole, ~1.17 eq.) and 15 mL of dichloromethane were added, and the resulting reaction mixture was heated to reflux under a nitrogen blanket. The reaction was monitored by thin layer chromatography. After two hours, no changes were observed in the chromatogram, so the reactive mixture was allowed to cool down to room temperature. 2-(2-cyano-2-(9H-thioxanthen-9-ylidene)acetamido)ethyl methacrylate was isolated as yellow crystals (3.2 grams, 82% yield) after passing through a short silica gel column ($CH_2C_{12}$, followed by 8 weight % EtOAc in $CH_2C_{12}$). $^1H$ NMR (500 MHz, $CDCl_3$) δ 1.84 (3H, s, $CH_3$), 3.47 (2H, m, $CH_2NH$), 4.01 (2H, t, $CH_2OC{=}O$), 5.55 (1H, m, vinylic), 5.91 (1H, bs, NH), 5.98 (1H, bs, vinylic), 7.24 (1H, t, Ar—H), 7.31 (1H, t, Ar—H), 7.39 (2H, m, Ar—H), 7.49 (1H, d, Ar—H), 7.55 (1H, m, Ar—H), 7.61 (1H, d, Ar—H), 8.04 (1H, m, Ar—H). The UV-VIS transmission spectrum of a 0.2 mM methanol solution Compound F is shown in FIG. 2.

Examples 7-9

Reactive monomer mixtures were prepared composed of 77 weight percent of the formulations listed in Table 1, and 23 weight percent of the diluent D3O. The reactive monomer mixtures were individually filtered through a 3 μm filter using a stainless-steel syringe under pressure.

TABLE 1

| Component (weight %) | Stock | Ex 7 | Ex 8 | Ex 9 |
|---|---|---|---|---|
| mPDMS | 31.79 | 31.01 | 31.61 | 30.91 |
| SiMAA | 28.46 | 27.75 | 28.29 | 27.67 |
| DMA | 24.48 | 23.88 | 24.35 | 23.81 |
| HEMA | 6.24 | 6.08 | 6.09 | 5.95 |
| TEGDMA | 1.56 | 1.52 | 1.5 | 1.5 |
| PVP K90 | 7.09 | 6.92 | 6.8 | 6.8 |
| Omnirad 1870 | 0.35 | 0.35 | 0.34 | 0.34 |
| RB247 | 0.02 | 0.02 | 0.02 | 0.02 |
| Compound E | 0.00 | 0.50 | 1 | 1 |
| Compound F | 0.00 | 1.98 | 0 | 2 |
| Total | 100 | 100 | 100 | 100 |

These reactive monomer mixtures were degassed at ambient temperature by applying vacuum (40 torr) for at least 20 minutes. Then, in a glove box with a nitrogen gas atmosphere and less than about 0.1-0.2 percent oxygen gas, about 75 μL of the reactive mixture were dosed using an Eppendorf pipet at room temperature into the FC made of 90:10 (w/w) Zeonor/TT blend. The BC made of 90:10 (w/w) Z:TT blend was then placed onto the FC. The molds were equilibrated for a minimum of twelve hours in the glove box prior to dosing. Pallets each containing eight mold assemblies were transferred into an adjacent glove box maintained at 65° C., and the lenses were cured from the top and the bottom using 435 nm LED lights having an intensity of about 1.5 $mW/cm^2$ for 3 minutes and then of about 2.5 $mW/cm^2$ for 7 minutes.

The lenses were manually de-molded with most lenses adhering to the FC and released by suspending the lenses in about one liter of 70 percent IPA for about one hour, followed by soaking two more times with fresh 70 percent IPA for 30 minutes; then two times with fresh DIW for 15 minutes; then two time with packing solution for 30 minutes. The lenses were equilibrated and stored in borate buffered packaging solution. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The average center thickness of each lens set was measured; Example 7=88 microns, Example 8=91 microns, Example 9=90 microns.

FIG. 3 shows the UV-VIS spectra of the lenses made in Examples 7-9 demonstrating that mixtures of Compound E and Compound F provide nearly complete absorption between 300 nm and 400 nm with significant absorption in the high energy visible region between 400 nm and 450 nm. Similar mixtures in combination with other UV-VIS blockers such as benzotriazoles (Norbloc) and/or at different concentrations can provide complete absorption between 300 nm and 400 nm with significant absorption in the high energy visible region between 400 nm and 500 nm.

Example 10

Synthesis of 3-((9-(dicyanomethylene)-9H-xanthen-3-yl)oxy)propyl methacrylate (Compound G) as shown in Scheme 7

Scheme 7

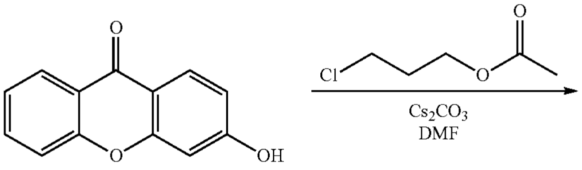

-continued

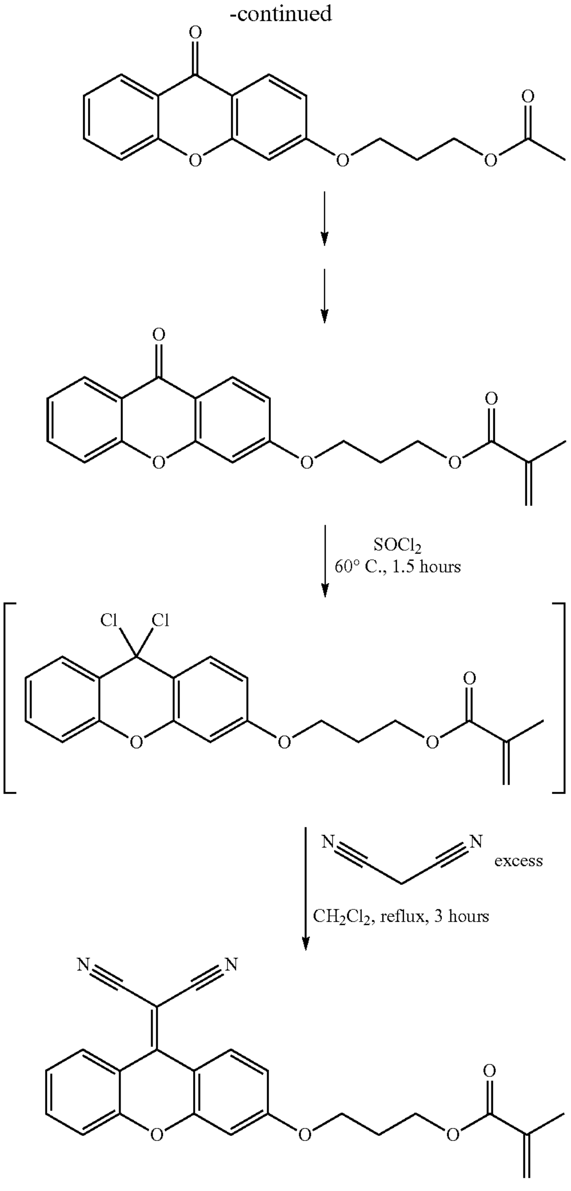

Compound G

Synthesis of 3-((9-oxo-9H-xanthen-3-yl)oxy)propyl acetate

A suspension of 3-hydroxy-9H-xanthen-9-one (42.4 grams, 0.2 mole), 70.0 grams $Cs_2CO_3$ (0.2 mole), and sodium iodide (catalytic 200 milligrams) were dried under vacuum in a 500 mL round bottom flask containing a magnetic stirring bar. Anhydrous DMSO (250 mL) was added followed by 2-chloroethyl methacrylate (30.0 grams, 0.2 mole). The reaction mixture was heated overnight at 70° C. Monitoring by TLC indicated complete consumption of the hydroxyxanthenone along with the formation of a less polar derivative. The reaction mixture was cooled to room temperature and slowly poured into dilute aqueous hydrochloric acid with constant stirring. After stirring for thirty minutes, the off-white solids were isolated by vacuum filtration using a fritted glass funnel. The filter cake was washed with deionized water, followed by two washes with 200 mL of hexanes. The 3-((9-oxo-9H-xanthen-3-yl)oxy) propyl acetate was vacuum dried at 60° C. to constant weight.

Synthesis of 3-((9-oxo-9H-xanthen-3-yl)oxy)propyl alcohol 27 grams of 3-((9-oxo-9H-xanthen-3-yl)oxy)propyl acetate was stirred in about 700 mL of methanol at room temperature, during which 20 mL of 10 N aqueous sodium hydroxide solution was added to the mixture, followed by about 30 mL of deionized water. Monitoring by TLC indicated that the hydrolysis reaction was complete within a few minutes. The mixture was slowly acidified by addition of dilute aqueous hydrochloride acid, after which 150 mL of deionized water was added while constantly stirring the system. The 3-((9-oxo-9H-xanthen-3-yl)oxy)propyl alcohol was isolated by vacuum filtration using a fritted glass funnel, washed with additional amounts of water, and finally dried in a vacuum oven at 60° C.

Synthesis of 3-((9-oxo-9H-xanthen-3-yl)oxy)propyl methacrylate 25 grams of 3-((9-oxo-9H-xanthen-3-yl)oxy)propanol and 15 mL (10.89 grams) of triethylamine were stirred in 300 mL of anhydrous acetonitrile in a three neck, one liter round bottom flask equipped with a magnetic stirring bar and a reflux condenser. Methacryloyl chloride (9.9 grams) was added to the flask in a dropwise fashion, and mixture was stirred for an hour. The volatile components were evaporated under reduced pressure, and the resulting solids were washed and filtered over a fritted glass funnel and rinsed with deionized water. The residue was washed further with dilute aqueous hydrochloric acid, followed by additional washes with deionized water and finally washed with hexanes. The 3-((9-oxo-9H-xanthen-3-yl)oxy)propyl methacrylate was then dried in a rotary evaporator with bath temperature maintained below 20° C.

Synthesis of 3-((9-(dicyanomethylene)-9H-xanthen-3-yl)oxy)propyl methacrylate (Compound G)

6.76 grams of 3-((9-oxo-9H-xanthen-3-yl)oxy)propyl methacrylate and 15 mL of thionyl chloride were heated for 2 hours at 65° C. (mantle temperature) in a round bottom flask equipped with a magnetic stirring bar and reflux condenser. The mixture was cooled to room temperature, and the excess thionyl chloride was evaporated under reduced pressure with the bath temperature maintained below 20° C. 3.96 grams of malononitrile was added to the flask, followed by 25 mL of anhydrous dichloromethane, and the mixture was stirred and heated at a gentle reflux for two hours. The mixture was cooled to room temperature and then flushed through a short silica gel plug eluting with methylene chloride. Volatile components were evaporated under reduced pressure with the temperature maintained below 20° C., after which the solids were suspended in cold methanol (100 mL) and stirred for 20 minutes. The crude product was isolated by vacuum filtration and the filter cake washed with additional cold methanol. 3-((9-(dicyanomethylene)-9H-xanthen-3-yl)oxy)propyl methacrylate was further purified by passing through a silica gel column eluting with methylene chloride. $^1H$ NMR (500 MHz, $CDCl_3$) δ1.95 (3H, $CH_3$), 2.25 (2H, m, $CH_2$), 4.20 (2H, t, $CH_2$ benzylic), 4.37 (2H, t, $CH_2O$ ester), 5.59 (1H, m, vinylic), 6.12 (1H, m, vinylic), 6.90 (1H, dAr-H), 6.97 (1H, dd, Ar—H), 7.40 (1H, ddd, Ar—H), 7.45 (1H, dd, ArH), 7.68 (1H, ddd, Ar—H), 8.50 (1H, d, Ar—H), 8.57 (1H, dd, Ar—H). The UV-VIS transmission spectrum of Compound Gin 0.2 mM dichloromethane is shown in FIG. 4 along with Compound E. The corresponding absorbance spectra are shown in FIG. 5. Compound G exhibited a molar extinction coefficient of 19,341 $L\cdot mol^{-1}\cdot cm^{-1}$ as calculated at lambda max $\lambda_{max}$=396 nanometers in 0.2 mM dichloromethane, while Compound E exhibited a molar extinction coefficient of 19,527 $L\cdot mol^{-1}\cdot cm^{-1}$ as calculated at lambda max $\lambda_{max}$=396 nanometers in 0.2 mM dichloromethane. Both Compounds E and G were more effective high-pass filters than Compound F in the blue light range having wavelengths between 400-450 nanometers.

Example 11

A reactive monomer mixture was prepared composed of 77 weight percent of the formulation listed in Table 2, and 23 weight percent of the diluent D3O. Compound G appeared to have better solubility in the reactive monomer mixture than Compound E. The reactive monomer mixture was filtered through a 3 μm filter using a stainless-steel syringe under pressure. The reactive monomer mixture was degassed at ambient temperature by applying vacuum (40 torr) for at least 20 minutes. Then, in a glove box with a nitrogen gas atmosphere and less than about 0.2 percent oxygen gas, about 75 μL of the reactive mixture was dosed using an Eppendorf pipet at room temperature into the FC made of 90:10 (w/w) Z/TT blend. The BC made of 90:10 (w/w) Z:TT blend was then placed onto the FC. The molds were equilibrated for a minimum of twelve hours in the glove box prior to dosing. Pallets each containing eight mold assemblies were transferred into an adjacent glove box maintained at 60° C., and the lenses are cured from the top and the bottom using 435 nm LED lights having an intensity of about 2.5 $mW/cm^2$ for 10 minutes.

The lenses were manually de-molded from the BC and released from the FC by suspending the lenses in about 500 mL of 70 percent IPA for about 75 minutes, followed by soaking two more times with fresh 70 percent IPA for 60 minutes; followed by soaking two times in DIW for about 60 minutes; then overnight packing solution. Finally, the lenses were equilibrated and stored in borate buffered packaging solution. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels.

The UV-VIS transmission spectrum of the Example 11 Lenses in borate buffered packing solution are shown in FIG. 6.

TABLE 2

| Component (weight %) | Ex. 11 |
|---|---|
| mPDMS | 30.9 |
| SiMAA | 27.9 |
| DMA | 23.9 |
| HEMA | 5.95 |
| TEGDMA | 1.5 |
| PVP K90 | 7 |
| Omnirad 1870 | 0.34 |
| Norbloc | 2 |

TABLE 2-continued

| Component (weight %) | Ex. 11 |
|---|---|
| RB247 | 0.01 |
| Compound G | 0.5 |

We claim:

1. An ophthalmic device that is a polymerization reaction product of a reactive mixture comprising: (a) a monomer suitable for making the ophthalmic device; and (b) a compound of formula II:

II

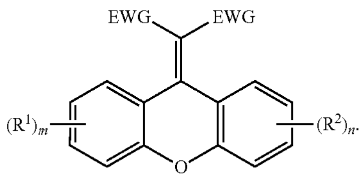

wherein m and n are independently 0, 1, 2, 3, or 4;

$R^1$ and $R^2$ are independently at each occurrence H, an optional substituent, or —Y—$P_g$, or two adjacent $R^1$ or $R^2$ groups, together with the atoms to which they are attached, combine to form a cycloalkyl or aryl ring optionally substituted with —Y—$P_g$;

EWG at each occurrence is independently an electron withdrawing group;

$P_g$ at each occurrence is independently a polymerizable group; and

Y at each occurrence is independently a linking group;

wherein the compound of formula II contains at least one $P_g$ group.

2. The ophthalmic device of claim 1 wherein the monomer suitable for making the device is selected from a hydrophilic component, a hydrophobic component, a silicone-containing component, or a mixture of two or more thereof.

3. The ophthalmic device of claim 1 that is a conventional hydrogel or a silicone hydrogel.

4. The ophthalmic device of claim 1 that is an intraocular lens or a soft contact lens.

5. The ophthalmic device of claim 1 wherein m and n are independently 0 or 1.

6. The ophthalmic device of claim 1 wherein $R^1$ is H, $C_1$-$C_6$ alkyl, $C_1$-$C_6$ alkoxy, $C_1$-$C_6$ thioalkyl, $C_3$-$C_7$ cycloalkyl, aryl, halo, hydroxy, amino, $NR^4R^5$, benzyl, $SO_3H$, or $SO_3Na$, wherein $R^4$ and $R^5$ are independently H or $C_1$-$C_6$ alkyl.

7. The ophthalmic device of claim 1 wherein $R^2$ is —Y—$P_g$.

8. The ophthalmic device of claim 1 wherein $P_g$ at each occurrence independently comprises styryl, vinyl carbonate, vinyl ether, vinyl carbamate, N-vinyl lactam, N-vinylamide, (meth) acrylate, or (meth) acrylamide.

9. The ophthalmic device of claim 1 wherein Y at each occurrence is independently alkylene, cycloalkylene, heterocycloalkylene, arylene, heteroarylene, oxaalkylene, alkylene-amide-alkylene, alkylene-amine-alkylene, or combinations of any of the foregoing groups.

10. The ophthalmic device of claim 1 wherein EWG at each occurrence is independently cyano, amide, ester, keto, or aldehyde.

11. The ophthalmic device of claim 1 wherein the compound of formula II contains one Y—$P_g$ group.

12. The ophthalmic device of claim 1 wherein the compound of formula II is:

3-((9-(dicyanomethylene)-9H-xanthen-3-yl)oxy)propyl methacrylate;

3-((9-(dicyanomethylene)-9H-xanthen-2-yl)oxy)propyl methacrylate;

1-((9-(dicyanomethylene)-9H-xanthen-3-yl)oxy)propan-2-yl methacrylate;

4-((9-(dicyanomethylene)-9H-xanthen-3-yl)oxy)butyl methacrylate;

3-((9-(dicyanomethylene)-9H-xanthen-3-yl)oxy)propyl acrylate;

1-((9-(dicyanomethylene)-9H-xanthen-3-yl)oxy)propan-2-yl acrylate;

4-((9-(dicyanomethylene)-9H-xanthen-3-yl)oxy)butyl acrylate;

N-(3-((9-(dicyanomethylene)-9H-xanthen-3-yl)oxy)propyl) methacrylamide;

N-(3-((9-(dicyanomethylene)-9H-xanthen-3-yl)oxy)propyl) acrylamide; or 3-((9-(dicyanomethylene)-9H-xanthen-3-yl) amino) propyl methacrylate.

13. An ophthalmic device comprising a polymeric network and a non-reactive polymer comprising repeating units derived from a compound of formula II:

II

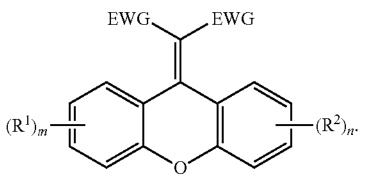

wherein m and n are independently 0, 1, 2, 3, or 4;

$R^1$ and $R^2$ are independently at each occurrence H, an optional substituent, or —Y—$P_g$, or two adjacent $R^1$ or $R^2$ groups, together with the atoms to which they are attached, combine to form a cycloalkyl or aryl ring optionally substituted with —Y—$P_g$;

EWG at each occurrence is independently an electron withdrawing group;

$P_g$ at each occurrence is independently a polymerizable group; and

Y at each occurrence is independently a linking group;

wherein the compound of formula II contains at least one $P_g$ group.

14. The ophthalmic device of claim 13 wherein the non-reactive polymer further comprises repeating units derived from an amide monomer, a monofunctional polyalkylene glycol, or a combination thereof.

15. The ophthalmic device of claim 14 wherein the amide monomer is an acyclic amide of formula H1 or H2, a cyclic amide of formula H3, or combinations thereof:

H1

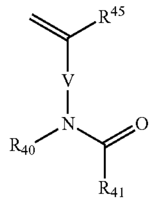

H2

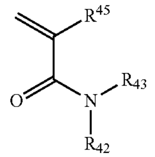

H3

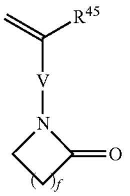

wherein $R^{45}$ is H or methyl; V is a direct bond, —(CO)—, or —($CONHR_{44}$)—; $R^{44}$ is $C_1$ to $C_3$ alkyl; $R_{40}$ is H or $C_1$ to $C_4$ alkyl; $R_{41}$ is H, $C_1$ to $C_4$ alkyl, amino having up to two carbon atoms, amide having up to four carbon atoms, and alkoxy having up to two carbon groups; $R_{42}$ is H, $C_1$ to $C_4$ alkyl groups; or methoxy, ethoxy, hydroxyethyl, or hydroxymethyl; $R_{43}$ is H, $C_1$ to $C_4$ alkyl; or methoxy, ethoxy, hydroxyethyl, or hydroxymethyl; wherein the number of carbon atoms in $R_{40}$ and $R_{41}$ taken together is 8 or less; and wherein the number of carbon atoms in $R_{42}$ and $R_{43}$ taken together is 8 or less; and f is a number from 1 to 10.

* * * * *